(12) United States Patent
Cicerone

(10) Patent No.: US 11,669,483 B2
(45) Date of Patent: *Jun. 6, 2023

(54) TRIGGER/ARRAY FOR USING MULTIPLE CAMERAS FOR A CINEMATIC EFFECT

(71) Applicant: Christian Cicerone, Phoenix, AZ (US)

(72) Inventor: Christian Cicerone, Phoenix, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/555,516

(22) Filed: Dec. 20, 2021

(65) Prior Publication Data

US 2022/0188261 A1 Jun. 16, 2022

Related U.S. Application Data

(63) Continuation of application No. 16/882,119, filed on May 22, 2020, now Pat. No. 11,210,258.

(60) Provisional application No. 62/950,379, filed on Dec. 19, 2019.

(51) Int. Cl.
G06F 13/00 (2006.01)
G06F 13/42 (2006.01)
G06F 13/40 (2006.01)

(52) U.S. Cl.
CPC ........ *G06F 13/4256* (2013.01); *G06F 13/409* (2013.01); *G06F 13/4054* (2013.01); *G06F 13/4068* (2013.01); *G06F 13/4213* (2013.01)

(58) Field of Classification Search
CPC .. G06F 13/00; G06F 13/4256; G06F 13/4054; G06F 13/4068; G06F 13/409; G06F 13/4213

See application file for complete search history.

(56) References Cited

U.S. PATENT DOCUMENTS

2020/0145253 A1* 5/2020 Hentz .................... H04L 12/417
2020/0195415 A1* 6/2020 Evans ..................... H04L 67/10

* cited by examiner

*Primary Examiner* — Henry Tsai
*Assistant Examiner* — Kim T Huynh
(74) *Attorney, Agent, or Firm* — Christopher P. Maiorana, PC

(57) ABSTRACT

An apparatus includes a plurality of output ports and a processor. The output ports may each be configured to connect to a respective trigger device and generate an output signal to activate the respective trigger device. The processor may be configured to determine a number of the trigger devices connected to the output ports, determine a timing between each of the number of the trigger devices connected, convert the timing for each of the trigger devices to fit a standard timing using offset values specific to each of the trigger devices and perform a trigger routine to trigger the output signal for each of the trigger devices connected. The trigger routine may activate each of the trigger devices connected according to an event. The offset values may delay triggering the trigger devices to ensure that the trigger devices are sequentially activated at intervals that correspond consistently with the standard timing.

20 Claims, 16 Drawing Sheets

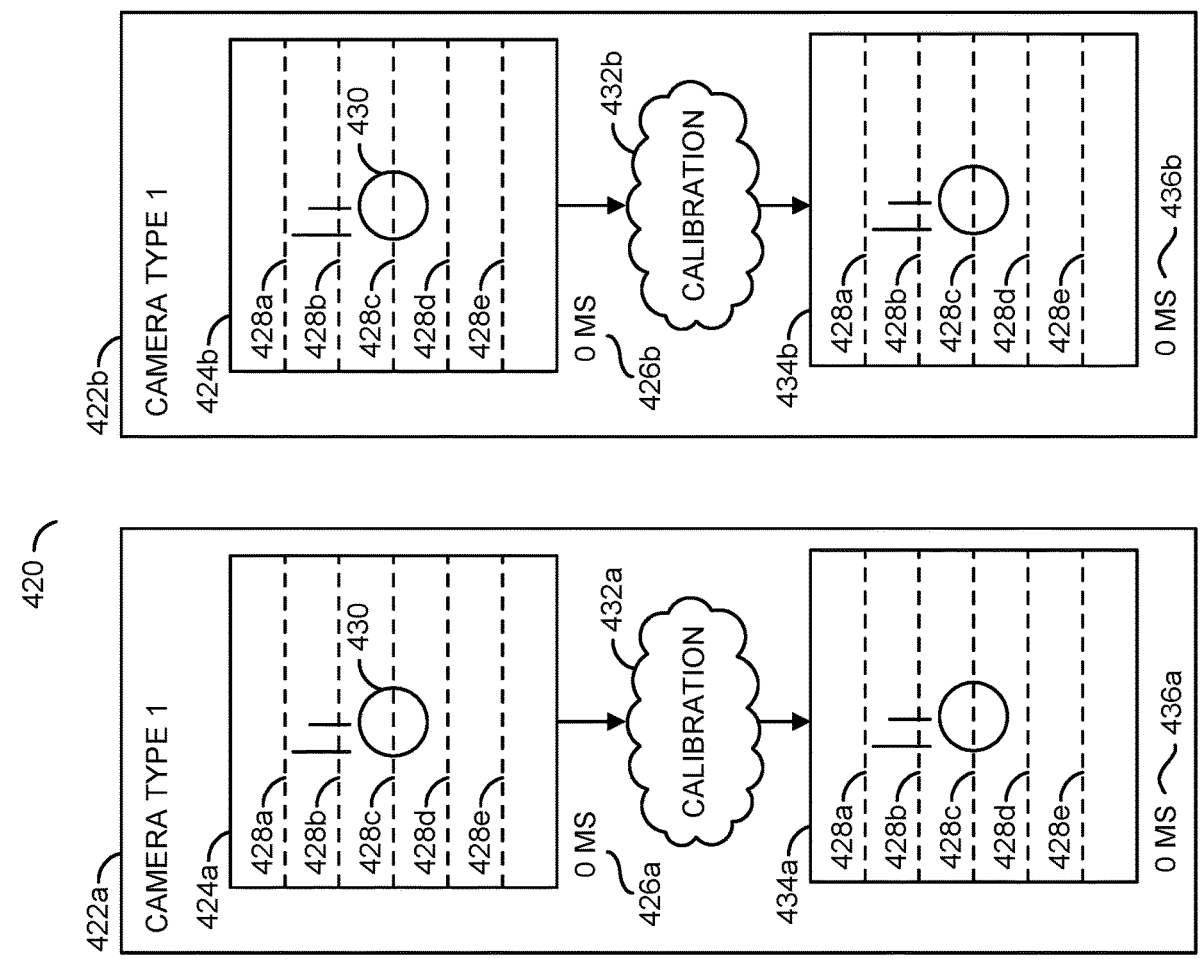

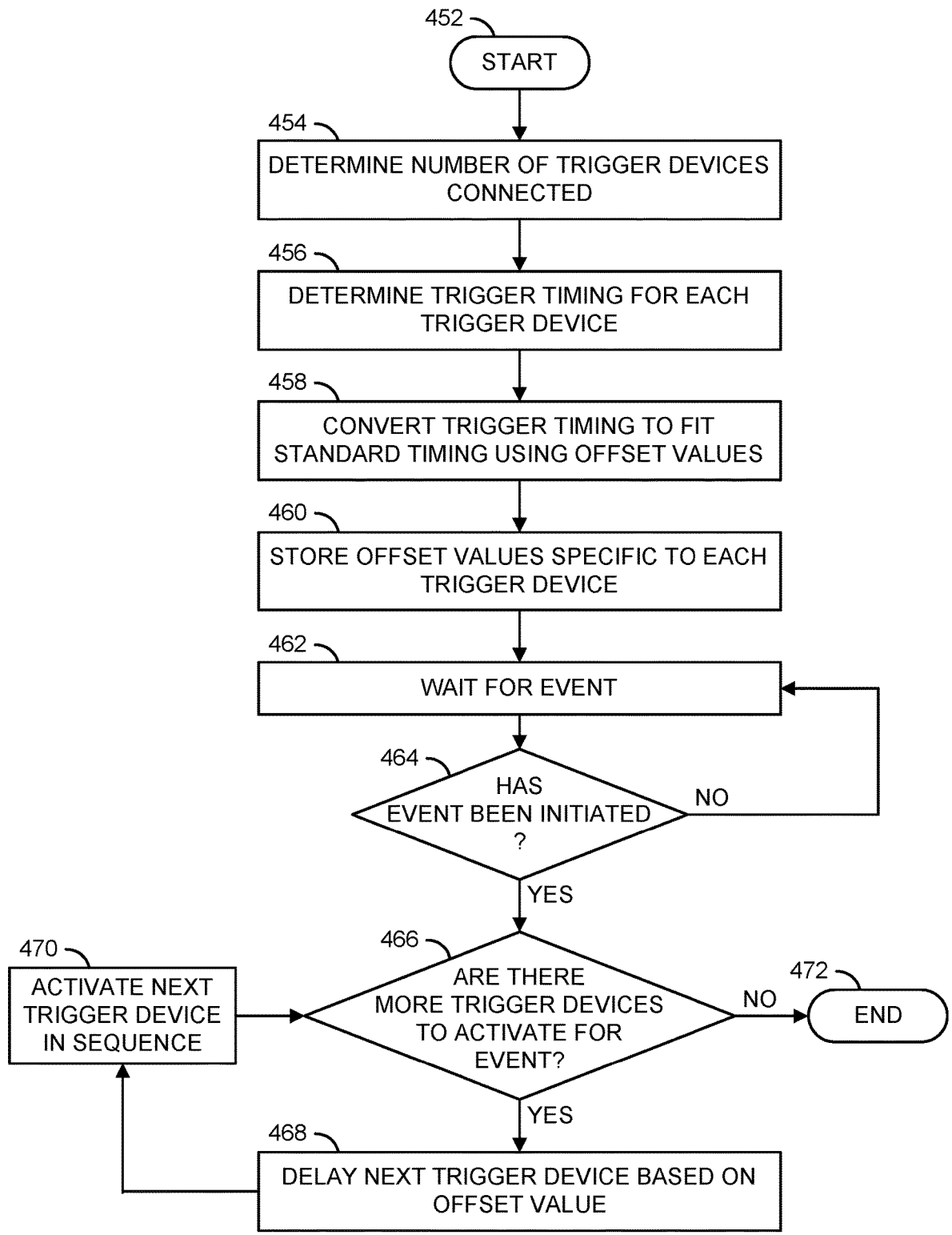

FIG. 10

```
500
  502 START
  504 COMMUNICATE WITH NODES CONNECTED TO HYBRID BUS
  506 DETERMINE NUMBER OF NODES ON HYBRID BUS
  508 CONNECT TO EXTERNAL DEVICES
  510 PERFORM CALIBRATION ROUTINE TO DETERMINE TIMING DATA FOR EXTERNAL DEVICES
  512 BROADCAST BUFFER DATA FOR EACH NODE ACCORDING TO TIMING DATA BEFORE EVENTS
  514 HAS EVENT BEEN INITIATED? NO → (back to 504)
       YES
  516 INITIATE TRIGGER ROUTINE
  518 TRIGGER EACH EXTERNAL DEVICE BASED ON EVENT AND TIMING DATA
  520 END
```

TRIGGER/ARRAY FOR USING MULTIPLE CAMERAS FOR A CINEMATIC EFFECT

This application relates to U.S. application Ser. No. 16/882,119, filed on May 22, 2020, which relates to U.S. Provisional Application No. 62/950,379, filed Dec. 19, 2019. Each of the mentioned applications are hereby incorporated by reference in its entirety.

FIELD OF THE INVENTION

The invention relates to communication standards generally and, more particularly, to a method and/or apparatus for implementing a trigger/array for using multiple cameras for a cinematic effect.

BACKGROUND

Video and other visual content is used extensively in art, advertisements and entertainment. As increased network capacity has enabled high resolution and high frame-rate video content to be communicated, there is more demand for both special (i.e., practical) effects and visual effects (e.g., digital or computer generated). While visual effects are improving at creating realistic 3D views, special effects are necessary. Furthermore, with the increasing popularity of virtual reality headsets, capturing high quality 3D views enhances the user experience.

Accurately triggering devices is important for creating special effects. Lights can be triggered using specific timings to create strobe effects, smoke can be triggered to create an atmospheric scene, explosions can be triggered for action scenes, cameras can be triggered to capture various perspectives of the same scene, etc. If the timing cannot be effectively controlled, then the intended outcome cannot be properly created, time and money can be wasted, or performers can be put at risk. Many devices can work together to create a particular effect. Each device can have different timings, and even devices that are the same can vary in performance. Controlling the timing accuracy of triggering the devices is a complex problem.

Configuring an entire array of devices to trigger is a cumbersome process. Merely adding or removing devices involves reconfiguring the timing for the entire array of devices. Directors and producers generally do not attempt multiple shots using different configurations to achieve a desired cinematic effect because of the time and cost of reconfiguring the array of devices.

It would be desirable to implement a trigger/array for using multiple cameras for a cinematic effect.

SUMMARY

The invention concerns an apparatus including a plurality of output ports and a processor. The output ports may each be configured to connect to a respective trigger device and generate an output signal to activate the respective trigger device. The processor may be configured to determine a number of the trigger devices connected to the output ports, determine a trigger timing between each of the number of the trigger devices connected, convert the trigger timing for each of the trigger devices to fit a standard timing using offset values specific to each of the trigger devices and perform a trigger routine to trigger the output signal for each of the trigger devices connected. The trigger routine may activate each of the trigger devices connected according to an event. The offset values may delay triggering the trigger devices to ensure that the trigger devices are sequentially activated at intervals that correspond consistently with the standard timing.

BRIEF DESCRIPTION OF THE FIGURES

Embodiments of the invention will be apparent from the following detailed description and the appended claims and drawings.

FIG. 8 is a diagram illustrating an example of calibration of triggering devices controlled by the system.

FIG. 9 is a flow diagram illustrating a method for triggering an array of devices for a cinematic effect.

FIG. 10 is a flow diagram illustrating a method for initiating a trigger routine based on timing data.

DETAILED DESCRIPTION OF THE EMBODIMENTS

Embodiments of the present invention include providing a trigger/array for using multiple cameras for a cinematic effect that may (i) implement a communication standard, (ii) enable nodes to communicate at data rates up to 1 Mbps, (iii) control device triggering, (iv) perform calibration routines to determine timing of devices for triggering devices accurately, (v) implement a CAN bus, (vi) enable nodes to dynamically switch between master and slave modes, (vii) implement a hybrid network, (viii) enable nodes to self-identify in a daisy-chain, (ix) generate timing offset values for triggering devices and/or (x) be implemented as one or more integrated circuits.

Embodiments of the present invention may be configured to implement a trigger for an array of devices. In an example of a multi-camera trigger system, the devices may be cameras, and triggering the array of cameras accurately may be used to create a cinematic effect. While an array of cameras may be triggered to create a cinematic effect, embodiments of the invention may implement a communications standard that may be used to control timing for triggering various devices for various purposes. In one example, devices (e.g., video cameras, smoke machines, lighting, etc.) may be triggered to create a cinematic effect. In another example, devices (e.g., photography cameras) may be triggered for a photogrammetry use case. The type of device triggered and/or the effect desired may be varied according to the design criteria of a particular implementation.

Figure 1:
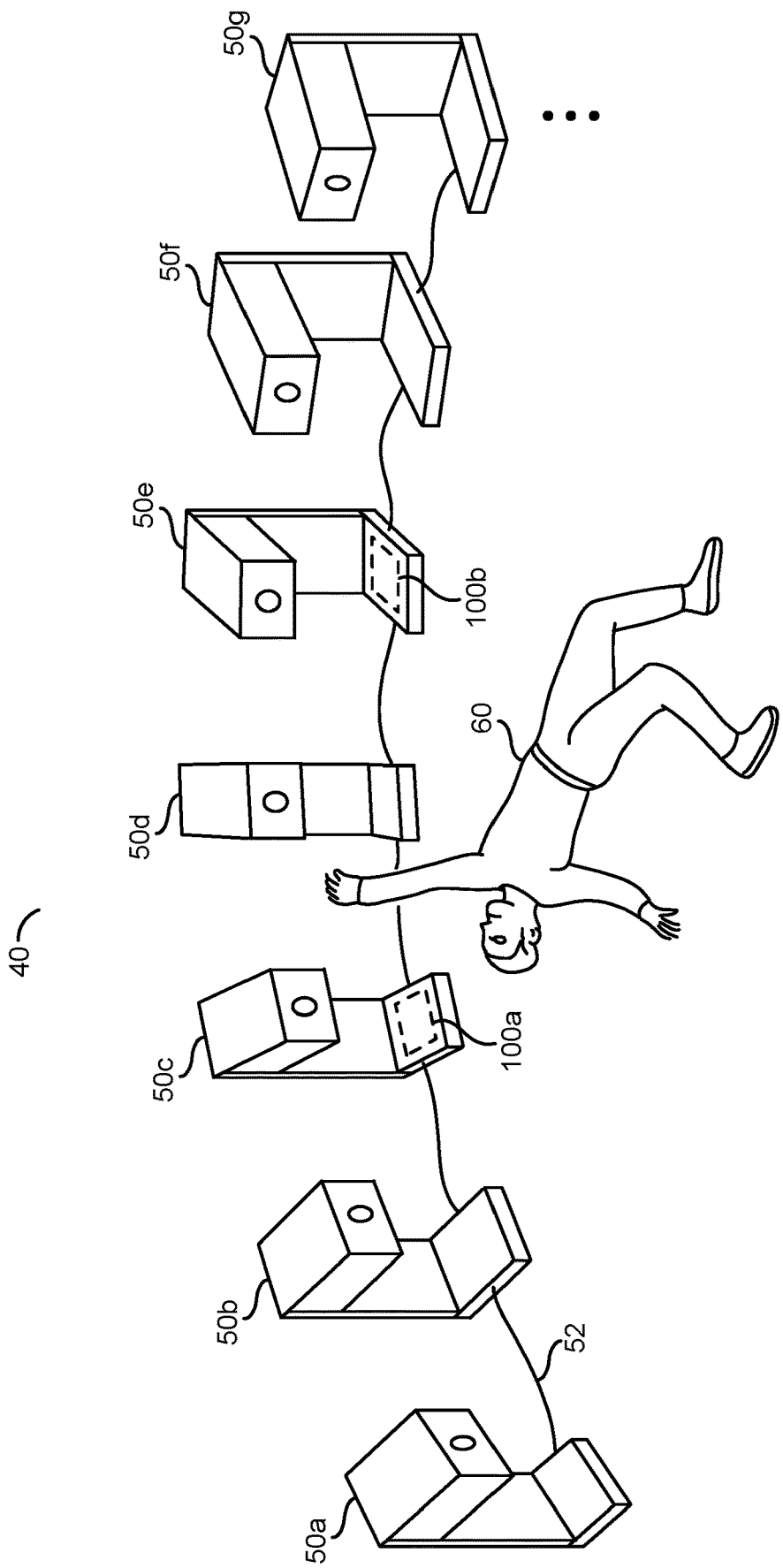
FIG. 1 is a diagram illustrating capturing a cinematic effect using an example implementation of the present invention.

Referring to FIG. 1, a diagram illustrating capturing a cinematic effect using an example implementation of the present invention is shown. An example scenario 40 is shown. The example scenario 40 may comprise a number of triggering devices 50a-50g. The triggering devices 50a-50g may be connected by cabling 52. The triggering devices 50a-50g are shown around a performer 60. While the view of the example scenario 40 may show seven of the triggering devices 50a-50g, any number of triggering devices (e.g., 50a-50n) may be implemented (e.g., the triggering devices 50a-50n may be configured to surround the performer 60).

An apparatus 100a and 100b are shown. The apparatus 100a is shown implemented in the triggering device 50c. The apparatus 100b is shown implemented in the triggering device 50e. In the example scenario 40, the triggering devices 50a-50g are shown as large units with a base for concealing wiring and the apparatus 100a-100b. Generally, the apparatus 100a-100b may be a unit separate from the triggering devices 50a-50g. While the apparatus 100a and the apparatus 100b are shown in the example scenario 40, any number of instances of the apparatuses 100a-100n may be implemented.

The cabling 52 is shown connected between the triggering devices 50a-50g. For simplicity, the cabling 52 is shown connected from one of the triggering devices 50a-50n to a neighboring one of the triggering devices 50a-50n. However, the cabling 52 may represent multiple wires, a bus and/or a daisy chained connection of the triggering devices 50a-50n and/or the apparatus 100a-100b. In one example, the cabling 52 may be daisy chained between the apparatus 100a and the apparatus 100b. In one example, the cabling 52 may provide additional wires between the apparatus 100a and the nearby cameras (e.g., 50a-50d) and the apparatus 100b and the nearby cameras (e.g., 50e-50g).

The apparatus 100a-100n may be configured to control a timing of the triggering devices 50a-50n. In an example, the triggering devices 50a-50n may be different types of devices that, when triggered, take different amounts of time before activating. In another example, the triggering devices 50a-50n may be the same type of devices (or even the exact same make/model of a device) that, because of manufacturing and/or environmental differences, take different amounts of time before activating when triggered. The apparatus 100a-100n may be configured to ensure that the triggering devices 50a-50n connected are sequentially activated at intervals that correspond consistently with a standard timing. The offset values may be specific to each of the triggering devices 50a-50n. The intervals may be selected based on an event to provide the cinematic effect.

The triggering devices 50a-50n may be any type of device that may be activated electronically. The triggering devices 50a-50n may be an array of triggering devices. The apparatuses 100a-100n may be configured to transmit a signal to the triggering devices 50a-50n to cause the triggering devices 50a-50n to activate to perform a function. In one example, the triggering devices 50a-50n may be video cameras. In another example, the triggering devices 50a-50n may be still cameras. In yet another example, the triggering devices may be smoke machines. In still another example, the triggering devices may be lights. In another example, the triggering devices may be pyrotechnic machines. The types of triggering devices 50a-50n implemented may be varied according to the design criteria of a particular implementation.

The example scenario 40 may show the triggering devices 50a-50g implemented as cameras. For example, the scenario 40 may be a film set and the performer 60 may be an actor and/or stunt performer. The cameras 50a-50g may be arranged to capture a cinematic effect. In the example shown, the cinematic effect may be a multi-camera capture of a scene that enables a perspective to be shifted around the performer 60 according to the timing of the activation of the video capture by the cameras 50a-50g. For example, by timing the cameras 50a-50g to capture video in sequence, the cinematic effect may result in the appearance of the perspective changing as the scene advances (e.g., sometimes referred to as the 'bullet time' effect). While the cinematic effect is shown as the bullet time effect in the example scenario 40 using video cameras, the apparatus 100a-100b may be used to perform the cinematic effect of a photogrammetry effect using still cameras.

The apparatus 100a-100n may be configured to connect to a number of the triggering devices 50a-50n. The apparatus 100a-100n may be configured to determine the number of the triggering devices 50a-50n connected. The apparatus 100a-100n may be configured to determine the timing between each of the triggering devices 50a-50n connected. The apparatus 100a-100n may be configured to convert the measured timing between each of the triggering devices 50a-50n connected to offset values for consistent activation of the triggering devices 50a-50n within a standard timing.

In one example, each of the apparatus 100a-100n may be configured to convert a 60 cycle signal to a 24 frame per second signal. In the example, the 24 frame per second timing may be the standard timing. The apparatus 100a-100n may be configured to automatically interrogate the triggering devices 50a-50n determine the timing between the triggering devices 50a-50n and convert and calculate the actual timing to generate the standard timing of 24 frames per second. In an example, the apparatus 100a-100n may calculate offset values to ensure that the triggering devices 50a-50n are activated at intervals within the standard timing so that the activation is consistent between devices. If one or more of the triggering devices 50a-50n are added (e.g., connected) or removed (e.g., disconnected) from the apparatus 100a-100n, the apparatus 100a-100n may be configured to automatically re-interrogate the connected triggering devices 50a-50n and re-calibrate the intervals to fit consistently in standard time for triggering the triggering devices 50a-50n. Generally, triggering a number of cameras at 24 frames per second may be implemented using a delay that may not need to be adjusted. In one example, the delay may be adjusted in a situation where the frame rate changes. In another example, the delay may be adjusted if camera ports are skipped.

In some embodiments, the standard time may be a fixed value and the triggering devices 50a-50n may be triggered with an equal amount of delay between the activation of each triggering device. In an example, the standard time may be a fixed value of five seconds between the activation of the first camera and the last camera. A timing of the interval may be adjusted in response to adding or removing the triggering devices 50a-50n to activate at equal intervals within the fixed standard time. In one example, if five cameras are implemented in a five second fixed standard time, then each interval may be one second. If five more cameras are added, then the interval may be adjusted to every half second. Other patterns of delaying the interval may be implemented (e.g., exponentially increasing the delay in between the activation of each camera).

Conventionally, capturing the cinematic effect may require mathematically calculating the activation intervals for the standard timing. Without the apparatus 100a-100n, a cinematographer may need to re-configure the timing. As a practical matter, due to time and cost overhead that may be added with delays in filming, a film crew would not adjust the number of the triggering devices 50a-50n during filming of a scene. Reconfiguring the timing for the array of the triggering devices 50a-50n becomes too cumbersome. The time and cost prevent cinematographers from modifying the array of the triggering devices 50a-50n to find a better take. The apparatus 100a-100n may enable the cinematographer to focus on shooting the scene, rather than doing math. Since the apparatus 100a-100n automatically re-calibrates the offset values to have the intervals for activating the triggering devices 50a-50n fit consistently with the standard timing, more of the triggering devices 50a-50n may be added or removed and the updated offset values may be re-calculated to fit the activation of the new number of the triggering devices 50a-50n to the standard timing. The ease of adding or removing the triggering devices 50a-50n using the apparatus 100a-100n may enable a cinematographer to attempt multiple takes of the same scene without significantly adding to the time and cost of filming.

Figure 2:
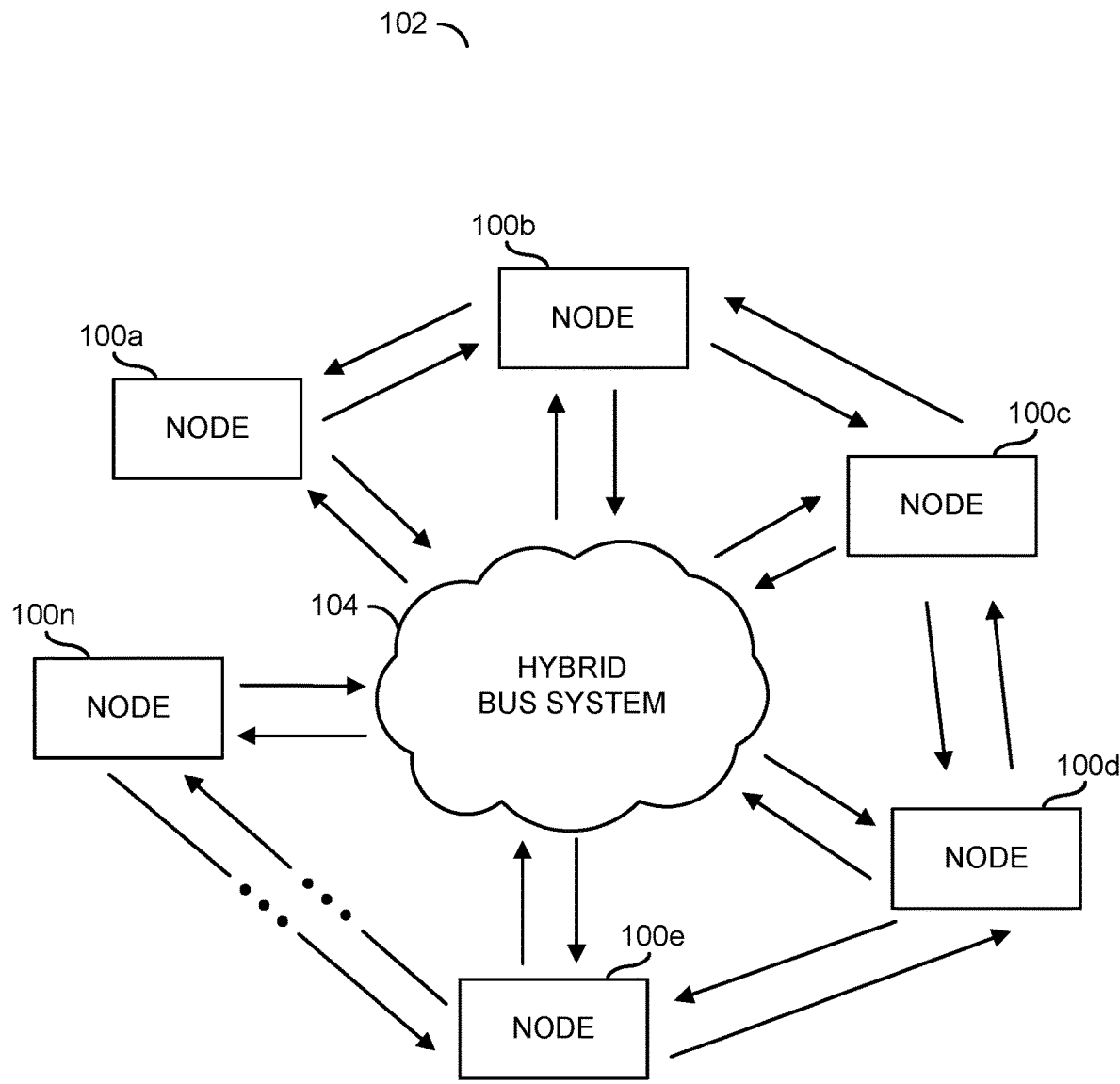
FIG. 2 is a block diagram illustrating multiple nodes communicating using a communications standard.

Referring to FIG. 2, a block diagram illustrating multiple nodes communicating using a communications standard is shown. A system 102 is shown. The system 102 may comprise the apparatus 100a-100n and a network/bus 104. The apparatus 100a-100n may be inter-connected to each other (e.g., daisy-chained). The apparatus 100a-100n may be connected to a bus 104. The bus 104 may be a hybrid bus system. For example, the hybrid bus system 104 may implement aspects of a multi-drop bus topology and a linear network topology.

In an example embodiment, the apparatus 100a-100n and the hybrid bus 104 may implement a hybrid bus multi-camera trigger system made up of multiple nodes. Each of the apparatus 100a-100n may implement a node. The system 102 may implement a communication standard. The nodes 100a-100n and the hybrid bus 104 may enable communication using the communication standard. In an example, the nodes 100a-100n may be used as part of a hybrid bus multi-camera trigger system utilizing the communication standard.

Each of the nodes 100a-100n may be configured to operate as a master device or slave device. Each of the nodes 100a-100n may be powered by the bus 104 and/or another power source (e.g., USB). Each of the nodes 100a-100n may be configured to self-identify in a daisy chain, self-terminate the bus 104 and/or communicate at data rates up to 1 mbps.

Each of the nodes 100a-100n may have multiple outputs and inputs for triggering the triggering devices 50a-50n, operator control and/or external device communication. Each of the nodes 100a-100n may implement lighting (e.g., LEDs) and/or graphical displays to present information (e.g., indicate how many of the triggering devices 50a-50n are connected). Each of the nodes 100a-100n may be configured to have one or more buttons for basic user interaction and/or configuration. Each of the nodes 100a-100n may be configured to communicate on the bus 104. Communicating on the bus 104 may enable the nodes 100a-100n to perform calibration routines to activate the triggering devices 50a-50n accurately by taking into account inherent delays of the triggering devices 50a-50n.

In an example, the triggering devices 50a-50n may be still photography cameras used to capture the cinematic effect of photogrammetry. Generally, photogrammetry may be a more technical process and/or be sensitive to the activation time of the triggering devices 50a-50n. For example, photogrammetry may be sensitive to syncing different model/brand of cameras that may have varying time delay offsets. The nodes 100a-100n may be configured to determine the offsets to ensure the standard timing to enable the desired cinematic effect. In an example, the triggering devices 50a-50n may be still cameras set up around a parking spot for a vehicle that may be synchronized using the system 102 to capture the photogrammetry cinematic effect of a vehicle parked in the parking spot.

Each of the nodes 100a-100n may be configured to dynamically switch between modes of operation (e.g., a master mode of operation and a slave mode of operation). Each of the nodes 100a-100n may be configured to self-terminate and/or self-identify. The nodes 100a-100n may be configured to execute calibration routines utilizing both output and input ports to record a timing of the external triggering devices 50a-50n. The calibration routines may enable the nodes 100a-100n to trigger the triggering device 50a-50n in a more accurate (e.g., synchronized according to the event) manner.

The system 102 may be configured with a series of the nodes 100a-100n. The nodes 100a-100n may be implemented to trigger/control the external triggering devices 50a-50n. For example, the external triggering devices 50a-50n may comprise any combination of cameras, light sources, constant lighting (e.g., LEDs), strobe lights, controllers (e.g., DMX512 or similar controllers), etc.

In some embodiments, the hybrid bus 104 may implement a CAN bus as a physical layer. The hybrid bus 104 and the nodes 100a-100n may implement self-identification in the daily-chain and self-termination for the CAN bus. The system 102 may be configured to implement an event buffering technique that configures the nodes 100a-100n before an actionable event takes place. Configuring the nodes 100a-100n before the actionable event may enable high speed and high precision triggering of any number of ports on the bus 104 (e.g., within 1 ms). In an example, the triggering capability within 1 ms of the system 102 may be an improvement of systems implementing DMX512 that update all 512 channels individually over 22 ms.

The system 102 may implement a hybrid bus 104 that may address thousands of channels. In an example, the system 102 may operate with an 8 kHz refresh rate (e.g., 0.125 ms) with a 1 Mbps data rate and a CAN bus packet size (e.g., frames). In an example, the system 102 may operate at approximately a range of 8700 frames per second to 17000 frames per second (e.g., approximately 8 kHz-17 kHz). The system 102 may be configured to have inherent error correction. In an example, the system 102 may operate at a bitrate of 1 mbps. The system 102 may be configured to operate with automatic bus termination. In an example, the maximum power of the bus 104 may be +24 VDC (1 A) per pin. The system 102 may implement the hybrid bus 104 (e.g., a mixture of both multi-drop bus and line-topology). In an example, bus power and the CAN bus may implement a multi-drop topology and sensor input/output hardware may implement a line topology (e.g., daisy-chained). The multi-drop bus portion of the hybrid bus 104 may be a linear bus (e.g., with two endpoints). For example, the nodes 100a-100n are shown having a first endpoint at the node 100a and a second endpoint at the node 100n (e.g., not connected to create a ring).

Figure 3:
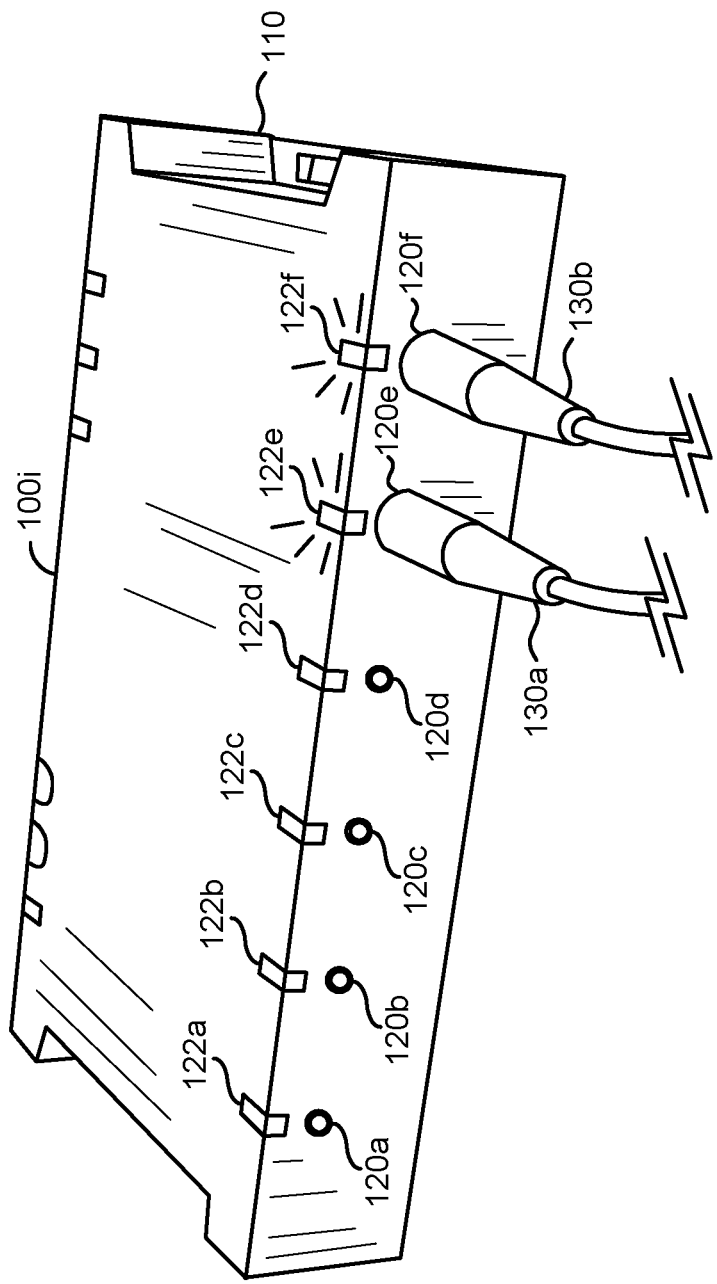
FIG. 3 is a diagram illustrating an example embodiment of the present invention.

Referring to FIG. 3, a diagram illustrating an example embodiment of the present invention is shown. A front view of the node 100i is shown. The node 100i may be a representative example of any of the nodes 100a-100n. For example, the description associated with the node 100i in FIG. 3 may be applicable to one or more of the nodes 100a-100n.

The node 100i may comprise a housing 110. The housing 110 may be an enclosure for the components of the node 100i. In an example, the housing 110 may be a plastic material, a metal material, etc.

The node 100i may comprise a number of ports 120a-120f. The ports 120a-120f may implement output ports. The output ports 120a-120f may be used to enable the triggering devices 50a-50n to be connected to the node 100i. For example, each of the nodes 100a-100n may be configured to control six cameras (e.g., six of the triggering devices 50a-50n). Multiple of the nodes 100a-100n may be connected together along with the triggering devices 50a-50n to create an array cameras. In one example, the output ports may be 3.5 mm TRS connections. In the example shown, the node 100i may comprise the six output ports 100a-100f. The number of ports 120a-120f implemented may be varied according to the design criteria of a particular implementation.

The node 100i may be configured to synchronize the external devices 50a-50n connected to the output ports 120a-120f. The synchronization of the external devices 50a-50n connected to the output ports 120a-120f may be determined based on timing data determined by the node 100i about the triggering devices 50a-50n. The synchronization of the triggering devices 50a-50n performed by the node 100i may be implemented regardless of which of the output ports 120a-120n are connected to the triggering devices 50a-50n. In an example, if one triggering device (e.g., 50a) is connected to the output port 120c, one triggering device (e.g., 50b) is connected to the output port 120d and one triggering device (e.g., 50c) is connected to the output port 120f, the node 100i may be configured to determine the number of the triggering devices 50a-50n connected (e.g., 3), determine the timing between each of the connected triggering devices (e.g., 50a-50c) and then convert the connected triggering devices 50a-50c to fit within the standard time (e.g., 24 frames per second) using offset values specific to each one of the triggering devices 50a-50n.

Lights 122a-122f are shown on the housing 110 of the node 100i. The lights 122a-122f may be LED lights. Each one of the lights 122a-122f may correspond to a respective output port 120a-120f. The lights 122a-122f may be indicator lights for the output ports 120a-120f. The output indicator lights 122a-122f may be configured to illuminate when the corresponding output port 120a-120f is connected to one of the output devices 50a-50n and/or one of the nodes 100a-100n. The output indicator lights 122a-122f may indicate various statuses of the output ports 120a-120f (e.g., off for disconnected, on for connected, blinking for determining timing data, different colors for connections to the triggering devices 50a-50n or the nodes 100a-100n, etc.).

Cables 130a-130b are shown. The cables 130a-130b may be part of the cabling 52 shown in association with FIG. 1. The cables 130a-130b may provide a connection to the triggering devices 50a-50n. For example, the cables 130a-130b may implement trigger cables. In the example shown, the cable 130a may be plugged into the output port 120e, which may cause the output indicator light 122e to illuminate and the cable 130b may be plugged into the output port 120f, which may cause the output indicator light 122f to illuminate.

Figure 4:
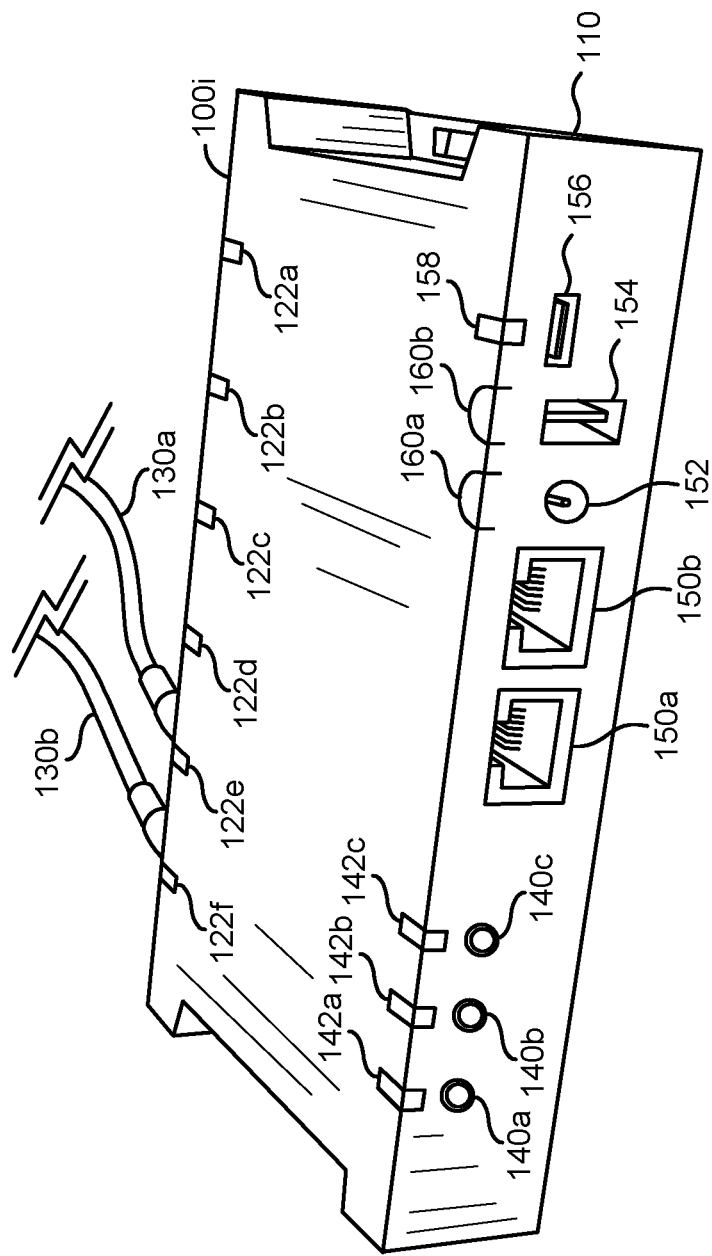
FIG. 4 is a diagram illustrating an alternate view of an example embodiment of the present invention.

Referring to FIG. 4, a diagram illustrating an alternate view of an example embodiment of the present invention is shown. A rear view of the node 100i is shown. The node 100i may be a representative example of any of the nodes 100a-100n. For example, the description associated with the node 100i in FIG. 4 may be applicable to one or more of the nodes 100a-100n.

The output indicator lights 122a-122f for the output ports 120a-120f (not visible from the rear view shown) and the cables 130a-130b are shown. On the rear face of the housing 110, ports 140a-140c are shown. The ports 140a-140c may be input ports and/or output ports. In one example, the port 140a may be an input port (e.g., implementing a 3.5 mm TRS connection). In one example, the ports 140b-140c may be output ports for peripherals (e.g., lighting cameras, etc.) implementing a 3.5 mm mono connection.

Lights 142a-142c are shown on the housing 110 of the node 100i. The lights 142a-142c may be LED lights. Each one of the lights 142a-142c may correspond to a respective port 140a-140c. The lights 142a-142c may be indicator lights for the ports 140a-140c.

Network ports 150a-150b are shown. The network ports 150a-150b may be configured to accept RJ45 connectors. For example, the network ports 150a-150b may provide the RJ45 hybrid bus connection with power. The node 100i may implement the network ports 150a-150n to connect to other of the nodes 100a-100nIn an example, any of the nodes 100a-100n may be connected to each other to send/receive data. In an example, the system 102 may utilizes the communication standard over a shielded RJ45 connection with 4× twisted pair cables. The network ports 150a-150b may be configured to connect in a daisy-chain configuration to implement the hybrid bus 104. In an example, the network ports 150a-150b may be connected to the cabling 52 shown in association with FIG. 1.

A power port 152 is shown. The power port 152 may be configured to accept an external power source (e.g., a 5V DC power supply, a 24V DC power supply, etc.). In the example shown, the power port 152 may accept a barrel type connector. In an example, the power port 152 may implement a female socket for a barrel connector that provides +24V for the hybrid-bus 104.

A USB port 154 and a USB port 156 are shown. In the example shown, the USB port 154 may be a USB-A type connector and the USB port 156 may be a micro-USB type connector or a USB-C type connector. The USB ports 154-156 may be configured to connect to a computer, a peripheral device (e.g., a game controller, a flash drive, a Bluetooth dongle, etc.) and/or a power supply. For example, the USB Type-C port 156 may be implemented to enable a computer connection, programming and/or a 5V power supply.

An indicator LED 158 is shown. The indicator LED 158 may be configured to indicate a status of the USB ports 154-156. Buttons 160a-160n are shown. The buttons 160a-160n may be integrated into the material of the housing 110. The buttons 160a-160b may be configured to enable an input for the node 100i.

The node 100i may be configured to perform plug-in (or insert) detection for the output ports 120a-120f and/or the ports 140a-140c. The plug-in detection may enable the node 100i to automatically detect when the output ports 120a-120f are connected to a device (e.g., the triggering devices 50a-50n and/or the nodes 100a-100n) and/or the ports 140a-140c are connected to a device. In one example, the input port 140a may be an input port for buttons, a hand controller, a relay, etc. In some embodiments, the input port 140a may be modified to accept more complex inputs. In another example, the ports 140b-140c may be output ports for cameras strobe lights, etc. In yet another example, the USB port 154 may be used as an input port for a touch screen controller.

The node 100i may implement a hardware based insert detection for the output ports 120a-120f and/or the ports 140a-140c. In some embodiments, the nodes 100a-100n may be implemented without the insert detection. Insert detection of the output ports 120a-120f and/or the ports 140a-140c may enable some automated tasks to be performed. In an example, with two of the nodes (e.g., 100i-100j) each with the six output ports 120a-120f having 2 connected cameras outputs (e.g., connected using the cables 130a-130b), the system 102 may adapt the cinematic effect to fit the number of cameras (based on plug-in detection) and the device order (based on node self-identification). Plug-in detection may enable the system 102 to know how many of the trigger devices 50a-50n are connected and how to trigger the trigger devices 50a-50n. For example, without insertion detection, all twelve output ports 120a-120f of the two nodes 100i-100j may send trigger commands which could have a negative effect on the cinematic effect unless manual configuration is performed. Plug-in detection may also conserve power on the bus 104 by preventing empty ports from triggering.

Insertion detection for the output ports 120a-120f may be implemented in hardware and/or software. Insertion detection for the ports 140a-140c may be implemented in hardware and software. Insertion detection for the USB ports 154-156 may be implemented in software.

In some embodiments, the hardware-based insertion detection may be designed to accommodate stereo/mono phone jack connectors (e.g., ¼" jack, 3.5 mm jack, etc.). In some embodiments, the hardware-based insertion detection may be configured to accept connectors with at least two contacts. In an example, some of the triggering devices 50a-50n may be video cameras that have non-standard trigger connectors that may be detected using the insertion detection hardware of the node 100i.

The output indicator lights 122a-122f, the input indicator lights 142a-142c and/or the USB indicator light 158 may be configured to indicate the insert detection status. In an example, the output indicator lights 122a-122f, the input indicator lights 142a-142c and/or the USB indicator light 158 may implement RGB LEDs to indicate the insert detection status, trigger modes and/or other system states to provide direct feedback to the user.

A computer may be connected to the node 100i. The computer may execute software that may be connected to a camera (e.g., the triggering devices 50a-50n), one or more of the nodes 100a-100n, and/or only one of the nodes 100a-100n (e.g., a master node). For example, the computer may associate camera serial numbers to the output ports 120a-120f within the system 102 (e.g., by triggering a camera and watching for USB camera activity on the computer/computer network). Using an external computer to detect camera serial numbers may be implemented with or without insert detection. For example, the computer executable instructions may trigger a port within the system 102, the corresponding one of the nodes 100a-100n may trigger the camera port and the computer may search for expected USB camera device activity (e.g., connected directly to the computer, or on a computer on the local network) and associate the camera serial number (and other USB camera device information) with the particular port 120a-120f of the particular node 100a-100n. In one example, the data stored by the computer may be used for further calibration of the nodes 100a-100n and/or calibration of the camera. In another example, the computer may be configured to save a camera and trigger port association to a file (e.g., a metadata file). In yet another example, the computer may be configured to use information to process metadata files in a particular manner based on a camera and/or trigger event attributes.

Figure 5:
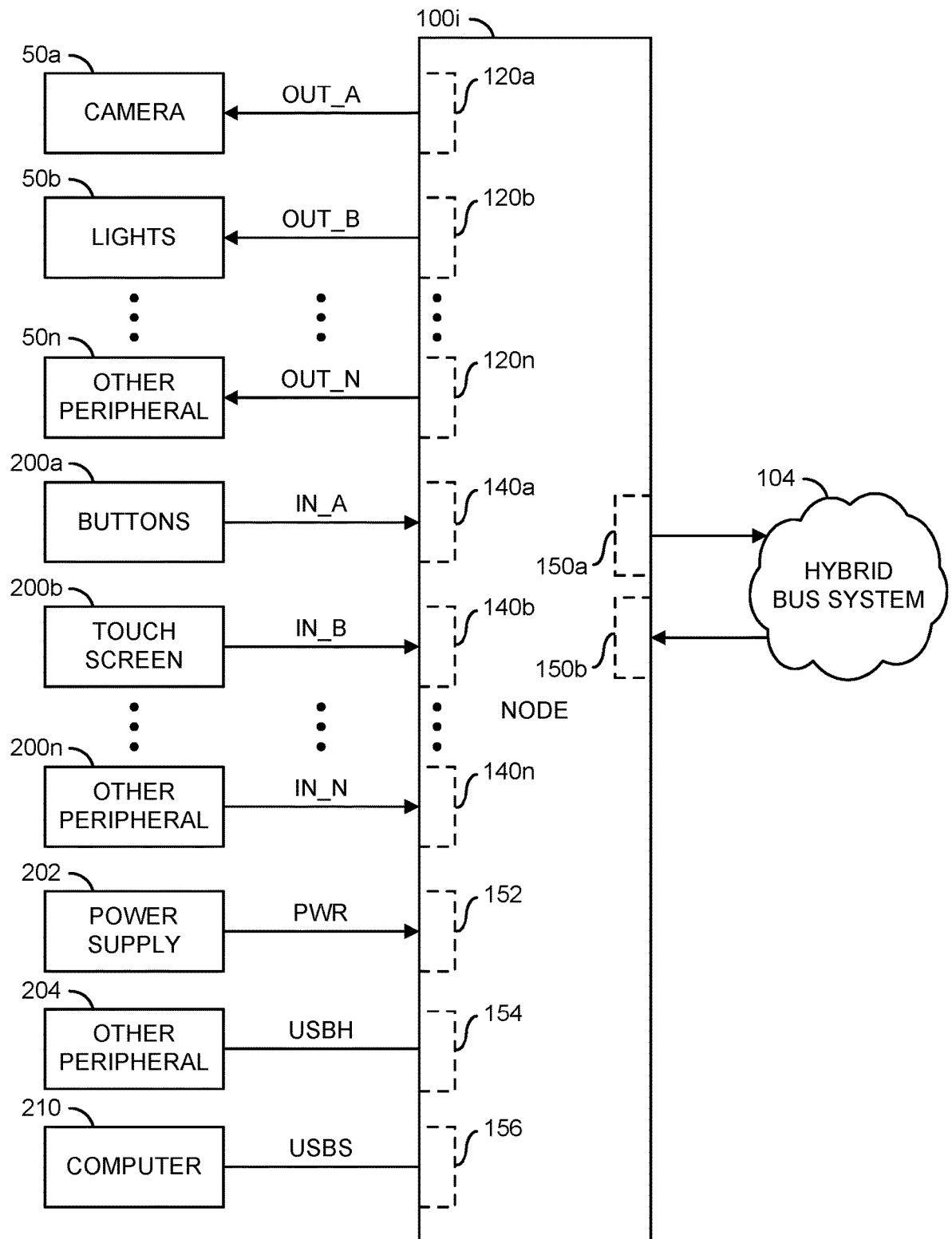
FIG. 5 is a block diagram illustrating input and output ports of an example node.

Referring to FIG. 5, a block diagram illustrating input and output ports of an example node is shown. The node 100i is shown as a representative example of the nodes 100a-100n. The node 100i is shown connected to the hybrid bus 104. The node 100i is shown comprising the output ports 120a-120n, the ports 140a-140n, the network ports 150a-150b, the power port 152 and/or the USB ports 154-156. In some embodiments, the port 140a may be an input port and the ports 140b-140n may be output ports having a similar implementation as the output ports 120a-120n.

The output ports 120a-120n may each be configured to present a respective signal (e.g., OUT_A-OUT_N) to the triggering devices 50a-50n. The ports 140a-140n may each be configured to receive a respective signal (e.g., IN_A-IN_N) from input devices 200a-200n. In one example, the port 140a may be an input port configured to receive the signal IN_A and the ports 140b-140n may be input/output ports configured to send one of the signals OUT_A-OUT_N and/or receive one of the signals IN_B-IN_N. The power port 152 may receive a signal (e.g., PWR) from a power supply 202. The USB port 154 may receive a signal (e.g., USBH) from a peripheral device 204. In some embodiments, the touchscreen 200b and/or other peripherals 200n may be connected to the USB port 154. The USB port may receive a signal (e.g., USBS) from a computer 210. The network ports 150a-150b may be connected to the hybrid bus 104.

The node 100i may have one or more trigger (output) ports 120a-120n (e.g., for cameras, lights, and other devices) that implement plug-in detection to record and indicate when a peripheral has been connected. The node 100i may have one or more controller (input) ports 140a-140n (e.g., for user or external device input) with plug-in detection to record and indicate when a peripheral has been connected. The node 100i may have one or more USB ports 154-156 for host and slave communication to external devices. In one example, the host communication may communicate the signal USBH to communicate with the peripheral device 204 (e.g., a game controller, a Bluetooth/Wi-Fi dongle, a keyboard, a storage device, etc.). In one example, the slave communication may communicate the signal USBS to communicate with the computer 210. In some embodiments, the node 100i may implement LED indicator lights and/or a graphical display to indicate the state of connections/modes/device details. In some embodiments, the node 100i may have one or more buttons for basic user interaction and/or configuration.

Figure 6:
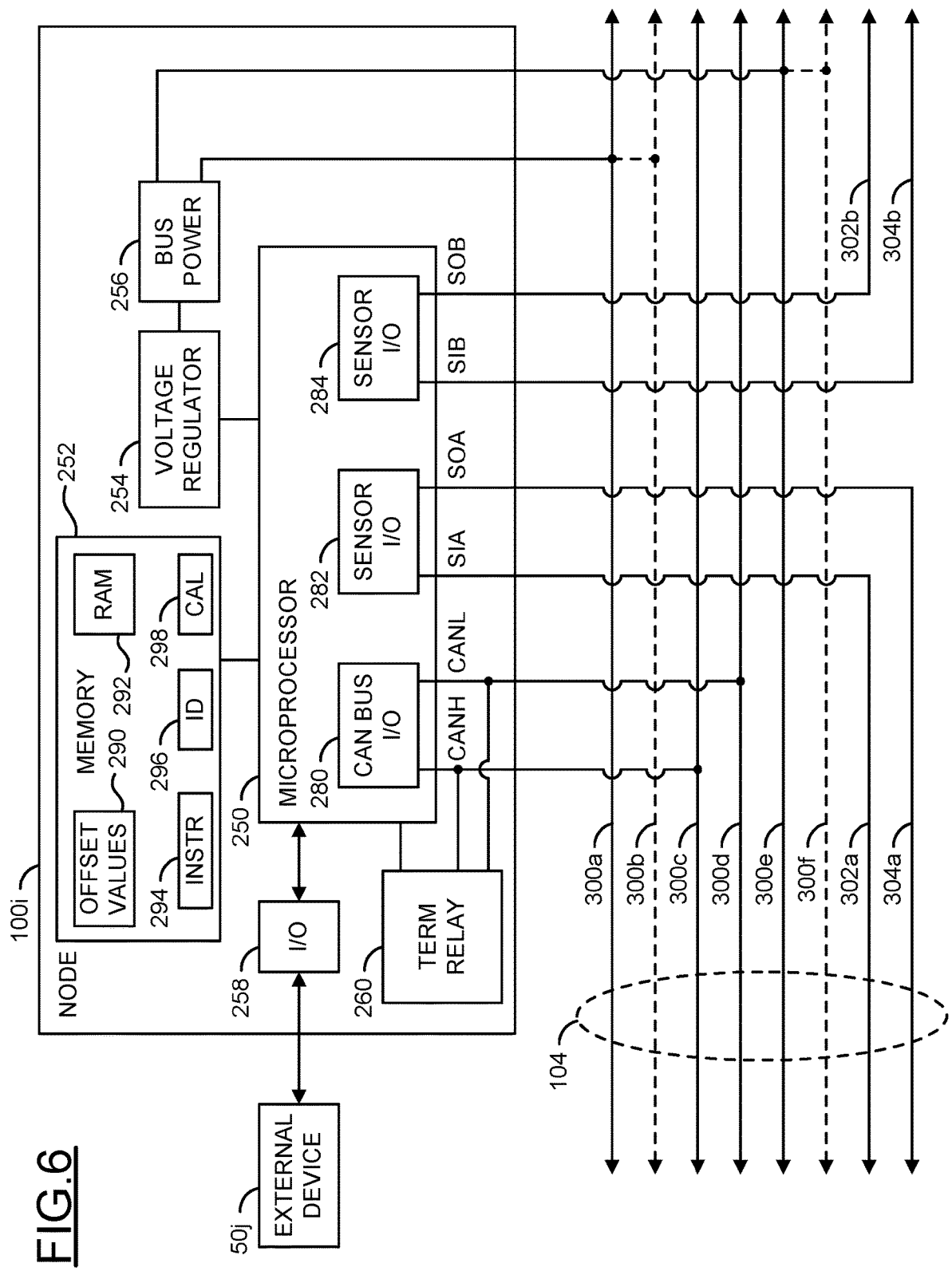
FIG. 6 is a block diagram illustrating components of a node connected to a hybrid bus.

Referring to FIG. 6, a block diagram illustrating components of a node connected to a hybrid bus is shown. A block diagram of the node 100i is shown as a representative example of the nodes 100a-100n. The node 100i is shown connected to the hybrid bus 104 and one of the triggering devices 50j.

The node 100i may comprise a microprocessor 250, a memory 252, a voltage regulator 254, a bus power 256, an I/O module 258 and/or a termination relay 260. The microprocessor 250 may comprise a CAN bus I/O module 280, a sensor I/O module 282 and/or a sensor I/O module 284. The memory 252 may comprise an offset value storage 290, RAM 292, instructions 294, an ID 296 and/or calibration routines 298.

The microprocessor 250 may be configured to execute computer readable instructions. In an example, the microprocessor 250 may execute the instructions 294 stored by the memory 252. In some embodiments, the insert detection for the USB ports 154-156 may be handled in software on the microprocessor 250 using a standard library. In some embodiments, the microprocessor 250 may implement some flash memory configured to store data between reboots of the node 100i. In some embodiments, the flash memory may be a component of the microprocessor 250. In some embodiments, the flash memory may be separate from the microprocessor 250 (e.g., part of the memory 252).

The memory 252 may be configured to store computer readable data. The voltage regulator 254 may be configured to provide a stable voltage to the microprocessor 250. The bus power 256 may be configured to receive input from the hybrid bus 104. The I/O block 258 may be configured to send/receive data to the external triggering devices 50a-50n (e.g., one external device 50j is shown, however, the I/O block 258 may be configured to connect to a number of the triggering devices 50a-50n up to the number of available output ports 120a-120f).

The CAN bus I/O module 280 may be configured to communicate a signal (e.g., CANH) and a signal (e.g., CANL). The signal CANH and the signal CANL may be communicated to/from the termination relay 260 and/or the hybrid bus 104. In an example, the signal CANH and the signal CANL may be differential signals used in the CAN bus protocol. In the example shown, the CAN bus I/O module 280 may be within the microprocessor 250. In some embodiments, the CAN bus I/O module 280 may be a separate component from the microprocessor 250. For example, the CAN bus I/O module 280 may be a circuit implemented between the microprocessor 250 and the CAN bus lines of the hybrid bus 104 that enables the microprocessor 250 to interface with CAN bus lines implemented by the hybrid bus 104.

The sensor I/O module 282 may be configured to receive a signal (e.g., SIA) and send a signal (e.g., SOA). The sensor I/O module 284 may be configured to receive a signal (e.g., SIB) and send a signal (e.g., SOB). The signal SIA, the signal SIB, the signal SOA and/or the signal SOB may be communicated to/from the hybrid bus 104.

The hybrid bus 104 may comprise a number of lines 300a-300f, 302a-302b and/or 304a-304b. In some embodiments, the hybrid bus 104 may comprise 6 pins (e.g., corresponding to the lines 300a, 300c, 300d, 300e, 302a-302b and 304a-304b). In an example, in a six pin implementation two of the pins may be for power (e.g., the line 300a and the line 300e), two of the pins may be for the CAN bus communication (e.g., the line 300c and the line 300d) and two of the pins may be for inter-node communication (e.g., the lines 302a-302b and the lines 304a-304b). In some embodiments, the hybrid bus 104 may comprise 8 pins (e.g., the lines 300a-300f, 302a-302b and 304a-304b). In an example, in an eight pin implementation four of the pins may be for power (e.g., the lines 300a-300b and the lines 300e-300f), two of the pins may be for the CAN bus communication (e.g., the line 300c and the line 300d) and two of the pins may be for inter-node communication (e.g., the lines 302a-302b and the lines 304a-304b). In some embodiments, the hybrid bus 104 may support bus power up to +24V, 2 A to power the nodes 100a-100n. In some embodiments, the hybrid bus 104 may support CAN bus data rates up to 1 mbps.

Each of the nodes 100a-100n may comprise the processor 250. The processor 250 may be configured to perform all the calculations (e.g., timing), control the triggering of the triggering devices 50a-50n, sense connected devices and/or perform communication. In an example, each of the nodes 100a-100n in the system 102 may be powered by bus power and/or USB power. Any of the nodes 100a-100n may be configured to distribute the bus power through the power connector 152 (e.g., a barrel connector configured for +12-24 vdc). In one example, the bus power may be implemented by using 2 wires for positive and 2 wires for negative (e.g., +24 v, GND) on a RJ45 connector (e.g., the connectors 150a-150b). In another example, the bus wiring may be 6 wires, 2 for CAN bus, 2 for power, 2 for sensor I/O.

Each of the nodes 100a-100n may be configured to control the triggering of the triggering devices 50a-50n connected to the output ports 120a-120f. In isolation, each of the nodes 100a-100n may be configured to individually control the triggering of the connected triggering devices 50a-50n without using the protocol of the hybrid bus 104 (e.g., the node 100a may be configured to control the triggering of the triggering devices 50a-50f connected to the output ports 120a-120f of the node 100a, the node 100b may be configured to control the triggering of the triggering devices 50g-50l connected to the output ports 120a-120f of the node 100b, etc.). By connecting the nodes 100a-100n together (e.g., daisy-chaining one or more of the nodes 100a-100n), the nodes 100a-100n may use the protocol of the hybrid bus 104 to control the triggering of the triggering devices 50a-50n. In an example, one of the nodes 100a-100n may be limited to controlling the number of the triggering devices 50a-50n based on the number of available output ports 120a-120f (e.g., six devices in the example shown in association with FIG. 3). By daisy chaining the nodes 100a-100n and implementing the communication standard of the hybrid bus 104, the number of triggering devices 50a-50n that may be controlled may be expanded beyond the number of the output ports 120a-120f of a single one of the nodes 100a-100n.

The sensor I/O module 282 may be an input sensor (or left side wiring in the network topography) and the sensor I/O module 284 may be an output sensor (or right side wiring in the network topography). The sensor I/O module 282 may receive the signal SIA from the line 302a. The sensor I/O module 282 may present the signal SOA to the line 304a. The sensor I/O module 284 may receive the signal SIB from the line 304b. The sensor I/O module 284 may present the signal SOB to the line 302b. Receiving input on the line 302a at the sensor I/O module 282 and receiving input on the line 304b at the sensor I/O module 284 and presenting output on the line 302b from the sensor I/O module 284 and presenting output on the line 304a from the sensor I/O module 282 (e.g., representing the line-topology aspect of the bus 104) may enable an ordering routine by the nodes 100a-100n (e.g., ordering a timing of triggering the triggering devices 50a-50n).

The calibration routines 298 may enable the system 102 to configure the timing of the triggering devices 50a-50n connected to each of the nodes 100a-100n. In one embodiment, the nodes 100a-100n may use the input port 140a to perform the calibration. The output ports 120a-120n may be configured to trigger the connected triggering devices 50a-50n (e.g., the output ports 120a-120n may be connected to a camera input) and the input port 140a may sense an output signal of the connected triggering devices 50a-50n to record a time delay. In one example, the CAN bus system may initiate the camera calibration routine. In an example, the microprocessor 250 may sense output from a strobe sync port (e.g., a common connector used on many cameras to trigger a strobe/flash light). The time delay of multiple triggering devices 50a-50n may be recorded (e.g., stored as the offset values 290). The microprocessor 250 may subtract the input time delays to generate offset values for every camera. When all of the triggering devices 50a-50n are triggered, the system 102 may automatically use the offset values 290 to delay the triggering devices 50a-50n (e.g., cameras) during the trigger routine (e.g., the event) so that the activation of the triggering devices 50a-50n are synchronized (e.g., a strobe sync signal is "aligned" for all cameras in the system 102).

The microprocessor 250 may be configured to determine the time delay of multiple triggering devices 50a-50n in response to reading metadata from the triggering devices 50a-50n. In an example, the microprocessor 250 may be configured to read metadata to determine various characteristics and/or technical specifications about the triggering devices 50a-50n. In one example, where one of the triggering devices 50a-50n is a camera, the metadata read by the microprocessor 250 may comprise a shutter speed, an amount of time to read an image frame from a sensor, a resolution, etc. The metadata may be used by the nodes 100a-100n to determine an amount of time to receive an output from the triggering devices 50a-50n after the triggering devices 50a-50n have been activated. Generally, the nodes 100a-100n may be configured to determine the time delay for the triggering devices 50a-50n without analyzing an image captured by the triggering devices 50a-50n.

In another example embodiment of the calibration routine 298, one or more of the nodes 100a-100n may be connected to the computer 210. The computer 210 may download images from the triggering devices 50a-50n (e.g., cameras). The computer 210 may analyze images captured from the cameras and automatically test various time delays (e.g., for camera and light/display) during triggering to determine a "sync" delay. Once the time delay is determined, the offset values 290 may be stored in the memory 252 and the microprocessor 250 may generate offset values for every camera. When the trigger routine is performed (e.g., triggering all of the cameras), the system 102 may automatically uses the offset values to delay the cameras during the trigger routine to synchronize the activation (e.g., delay triggering one or more of the triggering devices 50a-50n). A connection to the computer 210 may be optional. The computer 210 may send/receive data and/or instructions to any of the node 100a-100n on the bus 104.

Each of the nodes 100a-100n may be connected to the CAN bus (e.g., via the signal CANH and the signal CANL). The CAN bus (e.g., the lines 300c-300d) may enable the inter-node communication (e.g., for configuration, triggering, ordering, etc.). The wiring of the sensor I/O modules 282-284 and the lines 302a-302b and 304a-304b may be related to the ordering of the triggering devices 50a-50n. The two wires 302a-302b and 304a-304b may be physically separate from the CAN bus wires 300c-300d. The two wires 302a-302b and 304a-304b may enable the synchronization between the nodes 100a-100n. In the example shown, the signal SIA and the signal SOA communicated by the sensor I/O module 282 are shown directed towards the left and the signal SIB and the signal SOB communicated by the sensor I/O module 284 are shown directed towards the right.

When multiple nodes 100a-100n are connected to the hybrid bus 104, an input pin (e.g., for the signal SIA and the signal SIB configured as a pull-up pin) may be configured to detect a short and an output pin (e.g., the signal SOA and the signal SOB each connected to an opto-isolator) may be configured to short the input connection to ground.

The sensor I/O modules 282-284 may be configured to enable the node 100i to automatically self-terminate (e.g., auto-terminate). The sensor I/O modules 282-284 may be used by the nodes 100a-100n for ordering. In some embodiments, the sensor I/O modules 282-284 may be used to trigger events. The signal SOA, the signal SIA, the signal SOB and/or the signal SIB may be configured to enable the nodes 100a-100n to detect a neighboring one of the nodes 100a-100n and enable the nodes 100a-100n to announce (e.g., make known) the existence of the nodes 100a-100n to the neighboring nodes 100a-100n. Identifying the existence of the neighboring nodes 100a-100n and announcing a presence to the neighboring nodes 100a-100n may enable the nodes 100a-100n to properly terminate. The ordering of the nodes 100a-100n may rely on a single I/O direction.

The termination relay 260 may enable the node 100i to self-terminate. The node 100i may determine if the node 100i is at either end of the bus 104 using the sensor I/O modules 282-284. For example, if the node 100i is at the beginning of the bus 104, then the signal SIA and/or the signal SOA of the sensor I/O module 282 may not connect to another one of the nodes 100a-100n (e.g., the line 302a and/or the line 304a may not be connected to another node). In another example, if the node 100i is at the end of the bus 104, then the signal SIB and/or the signal SOB of the sensor I/O module 284 may not connect to another one of the nodes 100a-100n (e.g., the line 302b and/or the line 304b may not be connected to another node). If the node 100i is at the end of the bus 104, then the termination relay 260 may be turned on by the microprocessor 250. The termination relay 260 may terminate the signal CANH and the signal CANL with a resistor. The termination of the node 100i may occur independent of self-identification and/or ordering of the nodes 100a-100n in the system 102. In some embodiments, each of the nodes 100a-100n may terminate the bus 104 in order to utilize a low speed/fault tolerant CAN bus.

One of the sensor I/O modules 282-284 may be connected to the input port (e.g., the network port 150b), and the other one of the sensor I/O modules 282-284 may be connected to the output port (e.g., the network port 150a). The node (e.g., the node 100a shown in association with FIG. 2) with an open input port 150b may be defined as node 0. The node (e.g., the node 100n shown in association with FIG. 2) with an open output port 150a may be defined as node −1 (e.g., the last node). In some embodiments, the node 0 may perform the functions of the master node. However, the master node may be any one of the nodes 100a-100n.

When one of the nodes 100a-100n is powered on, the microprocessor 250 may determine if there are other of the nodes 100a-100n (e.g., a neighboring node) connected. If there is a neighboring node connected, then the microprocessor 250 may broadcast an "uninitialized" message on the CAN bus 300c-300d (e.g., using the signal CANH and CANL). By broadcasting the uninitialized message on the CAN bus 300c-300d, all of the nodes 100a-100n, including the master node, in the system 102 may receive the uninitialized message. The master node may initialize an ordering routine on the CAN bus 300c-300d in response to receiving the uninitialized message from one of the nodes 100a-100n. The ordering routine may cause the nodes 100a-100n to enter an ordering mode of operation.

In the ordering mode of operation, the nodes 100a-100n may use the sensor I/O modules 282-284 to send test data (e.g., a ping) along the chain of nodes 100a-100n (e.g., to the right). When one of the nodes 100a-100n receives the ping (e.g., received from the left) at the sensor I/O module 282, the receiving node may broadcast an identification value (e.g., a serial number) stored in the ID block 296. The serial number 296 may be broadcast to the master node and the master node may assign the node corresponding to the serial number a node number. The node may receive the node number and store the node number in the memory 252. After recording the node number, the node may ping the next node (e.g., to the right). The ordering routine may continue until all the nodes 100a-100n have been ordered (or ordering is cancelled by a message on the CAN bus 300c-300d).

The ordering routine may be a specific routine stored by the instructions 294. Once the ordering is finished, configuration and triggering may be sent on the CAN bus 300c-300d. All the nodes 100a-100n may receive the message at once. However, the nodes 100a-100n may respond and filter differently based on the content of the message, an assigned type and/or order.

The microprocessor 250 implemented on each of the nodes 100a-100n may be configured to subtract the delays determined by the calibration routine. The delays may be stored locally (e.g., the offset values 290). The delays may be communicated over the bus 104 to be stored remotely. One of the nodes 100a-100n operating as a master node (e.g., after having received the timing delays data) may use the offset values received from all of the nodes 100a-100n to configure and send buffered event data to the nodes 100a-100n.

The calibration routine may be initialized by the master node. In one example, the master node may communicate requests on the CAN bus 300c-300d for new offset timing from one of the nodes 100a-100n (e.g., a slave node). The slave node may run the calibration routine and store the offset values 290. The slave node may send the offset values 290 to the master node on the CAN bus 300c-300d. The master node may calculate buffered data for the entire system 102 in response to receiving the offset timing. The master node may send the new buffered data to all slave nodes 100a-100n. The master node may be further configured to perform the calibration routine locally on the output ports 120a-120f of the master node. The time calibration routine may be optional. In an example, the nodes 100a-100n may be configured to trigger the triggering devices 50a-50n without applying an offset value.

The master node may be configured to calculate new (e.g., updated) timing data in response to a state change. The state change may comprise a new device being connected to or disconnected from the system 102. In one example, the state change may be detected in response to connecting/disconnecting one of the triggering devices 50a-50n. In another example, the state change may be detected in response to connecting/disconnecting one of the nodes 100a-100n to the hybrid bus 104. In yet another example, the state change may be detected in response to one of the connected devices changing a mode of operation.

The timing data generated by the master node may be buffered data. The buffered data may be stored in the memory 252 of each of the nodes 100a-100n. The master node may generate the timing data and then broadcast the timing data to each of the slave nodes 100a-100n to be stored as the buffered data in the memory 252. The nodes 100a-100n may use (e.g., execute) the buffered data to perform the event.

The buffered data stored by each of the nodes 100a-100n may correspond to a particular event. When a trigger routine activates, the master node may broadcast an event instruction for the particular event. In response to the event instruction, the nodes 100a-100n may execute the buffered data. The buffered data may comprise timing data, offset values, calibration data, device instructions, etc. The implementation of the buffered data may be varied according to the design criteria of a particular implementation.

The nodes 100a-100n may store the buffered data for multiple events at the same time. The master node may broadcast multiple different event instructions. The nodes 100a-100n may select the buffered data corresponding to a particular trigger routine in response to the event instruction broadcast by the master node. The master node may communicate the event instruction on the CAN bus lines 300c-300d. The master node may communicate the event instruction using the signals SIA, SOA, SIB and/or SOB.

The system 102 may implement a buffering technique comprising calculating timing data before an event, broadcasting the timing data for an event to each of the nodes 100a-100n, and then using the buffered data stored to implement the event. Since the timing data for each of the nodes 100a-100n is stored as the buffered data in the memory 252, the sequence of operations performed by each of the nodes 100a-100n may be pre-configured before the event occurs. Storing the buffered data in the nodes 100a-100n may enable the event to be executed as quickly as possible (e.g., reduce a trigger lag time). In one example, the event may be executed within the duration of a single CAN bus message. In another example, the event may be executed within the duration of a signal sensor I/O signal (e.g., the signals SOA, SIA, SOB and/or SIB).

In some embodiments, each of the nodes 100a-100n implemented as slave nodes may be configured to individually calculate and store respective buffered data (e.g., the node 100a may calculate and store the buffered data for the node 100a, the node 100b may calculate and store the buffered data for the node 100b, etc.). The nodes 100a-100n may calculate and store respective buffered data if each of the nodes 100a-100n stores state and setting data for each of the nodes 100a-100n in the system 102. If each of the nodes 100a-100n calculate and store the respective buffered data, the master node may not broadcast the buffered data. The master node may broadcast an event instruction and each of the nodes 100a-100n may execute the trigger routine according to the respective buffer data. In an example, each of the nodes 100a-100n calculating and storing respective buffered data may be an advantage when the buffered data is expected to be a large size. The buffered data may be cross-checked by other of the nodes 100a-100n. The cross-checking of the buffered data may be performed by broadcasting and comparing the result of a checksum on the buffered data.

In the example shown, the bus 104 may comprise the CAN bus lines 300c-300d and the microprocessor 250 may communicate the signal CANH and the signal CANL. In another example, the communication between the nodes 100a-100n may be implemented utilizing an RS485 protocol. The type of protocol used to communicate on the bus 104 may be varied according to the design criteria of a particular implementation.

The microprocessor 250 of the nodes 100a-100n may be configured to convert the trigger timing between each of the triggering devices 50a-50n connected to the output ports 120a-120f to fit the standard time. For example, the offset values 290 may be generated to delay an activation of the triggering devices 50a-50n to ensure that the triggering devices 50a-50n are activated at consistent intervals to fit the standard time. The bus 104 may enable the conversion of the trigger timing to fit the standard time to be expanded according to the number of the triggering devices 50a-50n connected to multiple nodes 100a-100n. For example, if three of the nodes 100a-100n were daisy-chained and connected to thirteen of the triggering devices 50a-50n, the master node may be configured to automatically interrogate the nodes 100a-100n to determine the offset values 290 for each of the triggering devices 50a-50n. The offset values 290 may be used to provide even timing across all devices to fit within the standard time.

In some embodiments, the event may be performed by the trigger routine to capture the cinematic effect that uses even timing (e.g., evenly spaced intervals, intervals that are spread evenly throughout a time frame, etc.) to fit within the standard time. For example, the offset values may be used to ensure that each of the triggering devices 50a-50n are activated evenly across the standard time. For example, the offset values 290 may be used to ensure that each camera 50a-50n is activated sequentially at an evenly consistent interval to capture video frames (or still images) at the standard time of 24 frames per second.

In some embodiments, the event may be performed by the trigger routine to capture the cinematic effect that uses ramping to fit within the standard time. For example, the offset values may be used to ensure that each of the triggering devices 50a-50n are activated at pre-defined increasing intervals across the standard time. In an example, the triggering device 50a may be activated after 10 ms, then the triggering device 50b may be activated 20 ms later, then the triggering device 50c may be activated 30 ms later, etc. (e.g., the amount of interval is gradually increased by the pre-defined value of 10 ms). The amount of timing for the ramping cinematic effect may be varied according to the design criteria of a particular implementation.

Figure 7:
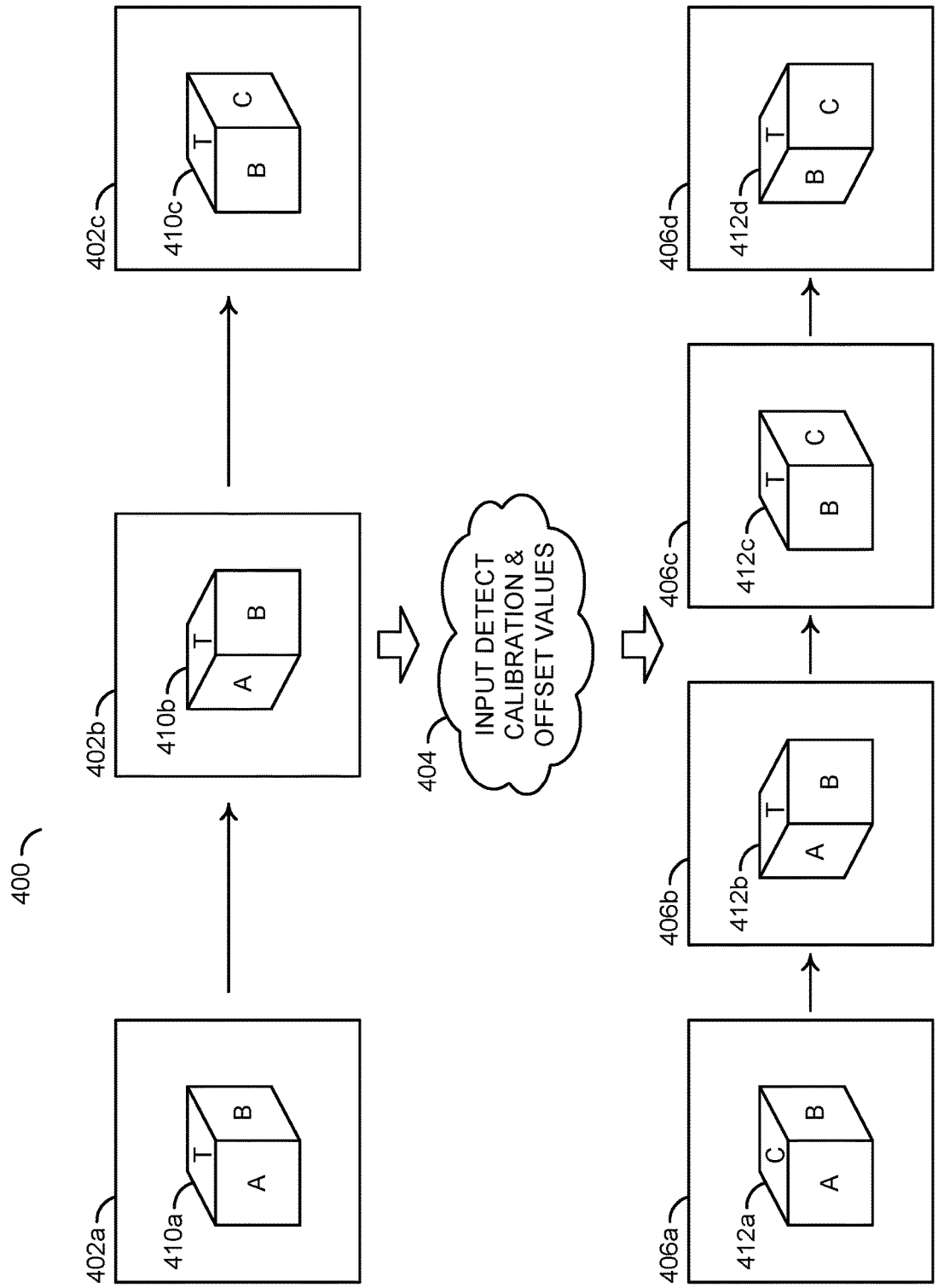
FIG. 7 is a diagram illustrating an example output of triggering devices controlled by the system.

Referring to FIG. 7, a diagram illustrating an example output of the triggering devices 50a-50n controlled by the system 102 is shown. An example scenario 400 is shown. The example scenario 400 may comprise output images 402a-402c, operations 404 performed by the system 102 and/or output images 406a-406n. The output images 402a-402c and/or the output images 406aa-406n may be generated by the triggering devices 50a-50n controlled by the nodes 100a-100n. In the example scenario 400, the triggering devices 50a-50n may implement still photograph cameras configured to provide an optical effect. In an example, the optical effect may be a photogrammetry effect.

The output images 402a-402c may comprise images of different angles 410a-410c of an object (e.g., shown as a cube with surfaces A, B, C and T). In the example scenario 400, the triggering device 50a may be positioned to capture the output image 402a showing the angle 410a of the cube (e.g., showing the surface A, and a depth of the surface B), the triggering device 50b may be positioned to capture the output image 402b showing the angle 410b of the cube (e.g., showing a depth of the surface A, and the surface B) and the triggering device 50c may be positioned to capture the output image 402c showing the angle 410c of the cube (e.g., showing the surface B and the depth of the surface C).

In the example scenario 400, the node 100i may control the triggering devices 50a-50c. With the three triggering devices 50a-50c connected, the microprocessor 250 may control the timing of the activation of the triggering devices 50a-50c to ensure that the output images 402a-402c are captured at intervals that fit within the standard timing. In the example scenario 400, only three output images 402a-402c are shown for illustrative purposes. In an example, the standard timing may be 24 frames per second and more than three output images may be controlled by the node 100i.

The operations 404 may be performed in response to connecting another one of the triggering devices 50a-50n to the node 100i. In an example, the triggering device 50d may be connected to the node 100i along with the triggering devices 50a-50c. When one of the triggering devices 50a-50n are connected to (or disconnected from) the node 100i, the microprocessor 250 may perform one or more of the operations 404. In an example, the input detection may detect the triggering device 50d being connected to the output port 120d. In another example, the microprocessor 250 may perform the calibration instructions 298 to determine the timing of the triggering devices 50a-50d. In yet another example, the microprocessor 250 may determine the offset values 290 to delay the activation of the triggering devices 50a-50d. Details of the operations 404 may be described in association with FIGS. 8-14.

The output images 406a-406d may comprise images of different angles 412a-412c of the same object shown in the output images 402a-402c (e.g., shown as a cube with surfaces A, B, C and T). In the example scenario 400, the triggering device 50a may be positioned to capture the output image 406a showing the angle 412a of the cube (e.g., showing the surface A, and a depth of the surface B), the triggering device 50b may be positioned to capture the output image 406b showing the angle 412b of the cube (e.g., showing a depth of the surface A, and the surface B), the triggering device 50c may be positioned to capture the output image 406c showing the angle 412c of the cube (e.g., showing the surface B and the depth of the surface C) and the triggering device 50d may be positioned to capture the output image 406d showing the angle 412d of the cube (e.g., showing the depth of the surface B, and the surface C). The angles 412a-412c may be the same as the angles 410a-410c. Adding the triggering device 50d may provide the output image 406d that captures the additional angle 412d.

In the example scenario 400, the node 100i may control the triggering devices 50a-50d. With the four triggering devices 50a-50d connected, the microprocessor 250 may control the timing of the activation of the triggering devices 50a-50d to ensure that the output images 406a-406c are captured at intervals that fit within the standard timing. In the example scenario 400, four output images 402a-402d are shown for illustrative purposes. In an example, the standard timing may be 24 frames per second and more than four output images may be controlled by the node 100i. In response to detecting the additional triggering device 50d, the microprocessor 250 may perform the operations 404. The operations 404 may adjust the timing of the triggering devices 50a-50d to capture the four output images 406a-406d within the same standard timing that was used to capture the three output images 402a-402c.

In one example, if the cinematic effect for the timing of the triggering devices 50a-50c provides a ramping effect, the node 100i may sequentially activate the triggering device 50a to capture the output image 402a, then 10 ms later the triggering device 50b to capture the output image 402b, then 20 ms later the triggering device 50c to capture the output image 402c. The operations 404 may be used to generate the offset values to ensure that the timings are precise when taking into account the inherent delays and/or differences between the triggering devices 50a-50n. In the example scenario 400, the operations 404 may ensure that the cinematic ramping effect is preserved when the triggering device 50d is added. For example, the operations 404 may generate delays to enable the node 100*i* to sequentially activate the triggering device 50*a* to capture the output image 406*a*, then 10 ms later the triggering device 50*b* to capture the output image 406*b*, then 20 ms later the triggering device 50*c* to capture the output image 406*c* and then 30 ms later the triggering device 50*d* to capture the output image 406*d*.

Referring to FIG. 8, a diagram illustrating an example of calibration of triggering devices controlled by the system is shown. An example scenario 420 is shown. The example scenario 420 may comprise examples of camera types 422*a*-422*c*. The examples of camera types 422*a*-422*c* may be one or more of the triggering devices 50*a*-50*n*. In the example shown, the camera types 422*a*-422*b* may be the same type (e.g., same make/model of camera) and the camera type 422*c* may be a different camera type. Different camera types may have different timings and/or triggering accuracy. For example, in response to receiving an instruction/signal to activate (e.g., capture an image and/or start recording video) via the signals OUT_A-OUT_N from one or more of the nodes 100*a*-100*n*, the different camera types 422*a*-422*c* may start recording, but may not start at exactly the same time (e.g., unsynchronized response to activation).

Each of the camera types 422*a*-422*c* are shown capturing a respective image 424*a*-424*c*. Each of the camera types 422*a*-422*c* are shown with a respective offset value 426*a*-426*c*. For the respective images 424*a*-424*c*, each of the camera types 422*a*-422*c* may have the same offset value of 0 ms. For an example with the offset values 426*a*-426*c*, one or more of the nodes 100*a*-100*n* connected to the camera types 422*a*-422*c* may trigger the cameras to capture the images 424*a*-424*c* at the same time (e.g., no delay).

Each of the images 424*a*-424*c* are shown with dotted lines 428*a*-428*e*. The lines 428*a*-428*c* may be reference locations. Each of the images 424*a*-424*c* may comprise an object 430. In the example shown, the object 430 may be a ball moving downwards (e.g., falling). For example, in the scenario 420, the triggering devices 50*a*-50*n* may be set up to capture images at the same time of the ball 430 falling.

In the image 424*a*, the ball 430 is shown at the reference location 428*c*. In the image 424*b*, the ball 430 is shown at the reference location 428*c*. In the image 424*c*, the ball 430 is shown at the reference location 428*e*. Since the camera types 422*a*-422*b* may have identical timings, the location of the ball 430 may be the same in the images 424*a*-424*b*. Having the ball 430 at the same location 428*c* may be the desired visual/cinematic effect. Since the camera type 422*c* has different timings than the camera types 422*a*-422*b*, the ball 430 may be at a different location in the image 424*c*. The ball 430 at a different location in the image 424*c* may be an undesired cinematic effect.

In the example shown, the signals OUT_A-OUT_C may be presented to the triggering devices 50*a*-50*c* having the camera types 422*a*-422*c* with 0 ms offset values 426*a*-426*c*. The ball 430 may fall downwards from the top reference location 428*a* towards the bottom reference location 428*e*. The camera types 422*a*-422*b* may trigger (e.g., activate capturing an image) faster than the camera type 422*c*. While the triggering devices 50*a*-50*n* may appear to activate at the same time to a bystander, a difference of a few milliseconds in activation time may cause a mismatch of the location of the ball 430 across the images 424*a*-424*c*. The camera type 422*c* may trigger slightly later, and the image 424*c* may not be captured until the ball 430 has fallen further to the reference location 428*e*.

Calibration operations 432*a*-432*c* are shown. The calibration operations 432*a*-432*c* may represent the calibration routines performed by the nodes 100*a*-100*n*. The calibration operations 432*a*-432*c* may be configured to synchronize the timing for the camera types 422*a*-422*c* to ensure that the triggering devices 50*a*-50*n* are activated (e.g., begin actually capturing an image) at the same time by taking into account inherent delays of the triggering devices 50*a*-50*n*. The calibration operations 432*a*-432*c* may be configured to generate the offset values 290 for the triggering devices 50*a*-50*n*. The calibration operations 432*a*-432*c* may correct for the differences in operation between the different camera types 422*a*-422*c*.

Each of the camera types 422*a*-422*c* are shown capturing a respective image 434*a*-434*c*. The images 434*a*-434*c* may be images of the same drop of the ball 430 as captured in the images 424*a*-424*c* (e.g., a second ball drop). Each of the camera types 422*a*-422*c* are shown with a respective offset value 436*a*-436*c*. The images 434*a*-434*c* and the offset values 436*a*-436*c* may correspond to images captured by the camera types 422*a*-422*c* after the calibration operations 432*a*-432*c* have been performed.

In the example shown, after the calibration operations 432*a*-432*c* the camera types 422*a*-422*b* may have the same offset value of 0 ms. For example, since the location of the ball 430 in the original images 424*a*-424*b* were synchronized, the camera types 422*a*-422*b* may not need to be offset with respect to each other. The offset value 436*c* may have the offset value 290 applied with a value of −50 ms.

The images 434*a*-434*c* may each show the ball 430 and the reference locations 428*a*-428*e*. In each of the images 434*a*-434*c* the ball 430 is shown at the location 428*c*. With the ball 430 at the same location 428*c*, the images 434*a*-434*c* may be synchronized. The synchronization resulting from the calibration operations 432*a*-432*c* may enable the triggering devices 50*a*-50*n* with different timings and/or characteristics to generate output with the desired cinematic effect.

The offset value 436*c* may be configured to enable the camera type 422*c* to be synchronized with the camera types 422*a*-422*b*. In one example, the offset value 436*c* may be configured to cause the camera type 422*c* to be triggered earlier than the camera types 422*a*-422*b* (e.g., the signal OUT_C may be activated 50 ms earlier than the signals OUT_A-OUT_B). By activating the camera type 422*c*, the inherent delay of the camera type 422*c* may cause the actual activation (e.g., the capture of the image 434*c*) to occur at the same time of the actual activation of the camera types 422*a*-422*b*. In some embodiments, the calibration operations 432*a*-432*c* may result in the offset values 436*a*-436*c* delaying the activation of the camera types 422*a*-422*b* (e.g., delay triggering of the triggering devices 50*a*-50*n* having faster activation). In some embodiments, the calibration operations 432*a*-432*c* may result in the offset values 436*a*-436*c* activating the camera type 422*c* (e.g., having slower activation) early. The type of delay implemented to synchronize the triggering devices 50*a*-50*n* may be varied according to the design criteria of a particular implementation.

Referring to FIG. 9, a method (or process) 450 is shown. The method 450 may trigger an array of devices for a cinematic effect. The method 450 generally comprises a step (or state) 452, a step (or state) 454, a step (or state) 456, a step (or state) 458, a step (or state) 460, a step (or state) 462, a decision step (or state) 464, a decision step (or state) 466, a step (or state) 468, a step (or state) 470, and a step (or state) 472.

The step 452 may start the method 450. In the step 454, the microprocessor 250 (e.g., the processor of the node 100*i*) may determine a number of the trigger devices 50*a*-50*n* connected to the node 100*i*. In an example, the input detection may be implemented by the node 100*i* to detect which of the output ports 120*a*-120*n* are connected to the triggering devices 50*a*-50*n*. Next, in the step 456, the microprocessor 250 may determine a trigger timing for each of the trigger devices 50*a*-50*n*. In an example, the microprocessor 250 may execute the computer readable instructions stored in the calibration routine 298. In the step 458, the microprocessor 250 may convert the trigger timing to fit a standard timing using offset values. In one example, the standard timing may be 24 frames per second and the offset values 290 may be calculated to ensure that the triggering devices 50*a*-50*n* are activated at intervals to provide activation times that are consistent between the triggering devices 50*a*-50*n*. Next, in the step 460, the microprocessor 250 may store the calculated offset values 290 in the memory 252. In the step 462, the microprocessor 250 may wait for an event (e.g., a triggering event). In an example, the triggering event may be initiated in response to input received at one of the input ports 140*a*-140*n* and/or from the computer 210 via the signal USBS. Next, the method 450 may move to the decision step 464.

In the decision step 464, the microprocessor 250 may determine whether the triggering event has been initiated. If the triggering event has not been initiated, then the method 450 may return to the step 462. For example, the node 100*i* may operate in an idle state until receiving an input to initiate the triggering event (or other instructions are received such as re-ordering, re-calibration, one or more of the triggering devices 50*a*-50*n* are added/removed, etc.). If the triggering event has been initiated, then the method 450 may move to the decision step 466.

In the decision step 466, the microprocessor 250 may determine whether there are more of the triggering devices 50*a*-50*n* to activate according to the triggering event. In an example, the triggering event may provide instructions about the timing and/or order of activating the triggering devices 50*a*-50*n* (e.g., a ramping pattern, an evenly spaced interval pattern, etc.). If there are more of the triggering devices 50*a*-50*n* to activate for the triggering event, then the method 450 may move to the step 468. In the step 468, the microprocessor 250 may delay activation of the next one of the triggering devices 50*a*-50*n* based on the offset values 290. In an example, one of the offset values 290 stored may provide an amount of delay for a specific one of the triggering devices 50*a*-50*n*. Next, in the step 470, the microprocessor 250 may activate the next one of the triggering devices 50*a*-50*n* in the sequence for the triggering event. In an example, the microprocessor 250 may cause the I/O block 258 to generate one of the signals OUT_A-OUT_N from the output ports 120*a*-120*n* to activate a particular one of the triggering devices 50*a*-50*n*. Next, the method 450 may return to the decision step 466.

In the decision step 466, if there are no more of the triggering devices 50*a*-50*n* to activate for the triggering event, then the method 450 may move to the step 472. In an example, there may be no more of the triggering devices 50*a*-50*n* to activate when the triggering event has been completed. The step 472 may end the method 450.

Referring to FIG. 10, a method (or process) 500 is shown. The method 500 may initiate a trigger routine based on timing data. The method 500 generally comprises a step (or state) 502, a step (or state) 504, a step (or state) 506, a step (or state) 508, a step (or state) 510, a step (or state) 512, a decision step (or state) 514, a step (or state) 516, a step (or state) 518, and a step (or state) 520.

The step 502 may start the method 500. In the step 504, the nodes 100*a*-100*n* may communicate with other of the nodes 100*a*-100*n* connected to the hybrid bus 104. Next, in the step 506, the nodes 100*a*-100*n* may determine the number of the nodes 100*a*-100*n* connected to the hybrid bus 104. In the step 508, one or more of the triggering devices 50*a*-50*n* may be connected to any of the nodes 100*a*-100*n*. Next, in the step 510, the nodes 100*a*-100*n* may perform the calibration routine 298 to determine the timing data for the external devices 50*a*-50*n*. In the step 512, the master node may broadcast the buffer data to each of the nodes 100*a*-100*n* according to the timing data before the triggering events are initiated. In one example, the buffering may be implemented by the nodes 100*a*-100*n* storing timing data in a buffer (e.g., the memory 252). Next, the method 500 may move to the decision step 514.

In the decision step 514, the nodes 100*a*-100*n* may determine whether the triggering event has been initiated. If the triggering event has not been initiated, then the method 500 may return to the step 504. If the triggering event has been initiated, then the method 500 may move to the step 516. In the step 516, the system 102 may initiate the triggering event. For example, the master node may initiate the triggering event by broadcasting the event instructions for a particular event. Next, in the step 518, each of the nodes 100*a*-100*n* may trigger each of the triggering devices 50*a*-50*n* connected based on the event and/or the timing data (e.g., the buffered data such as the stored offset values 290). Next, the method 500 may move to the step 520. The step 520 may end the method 500.

Figure 11:
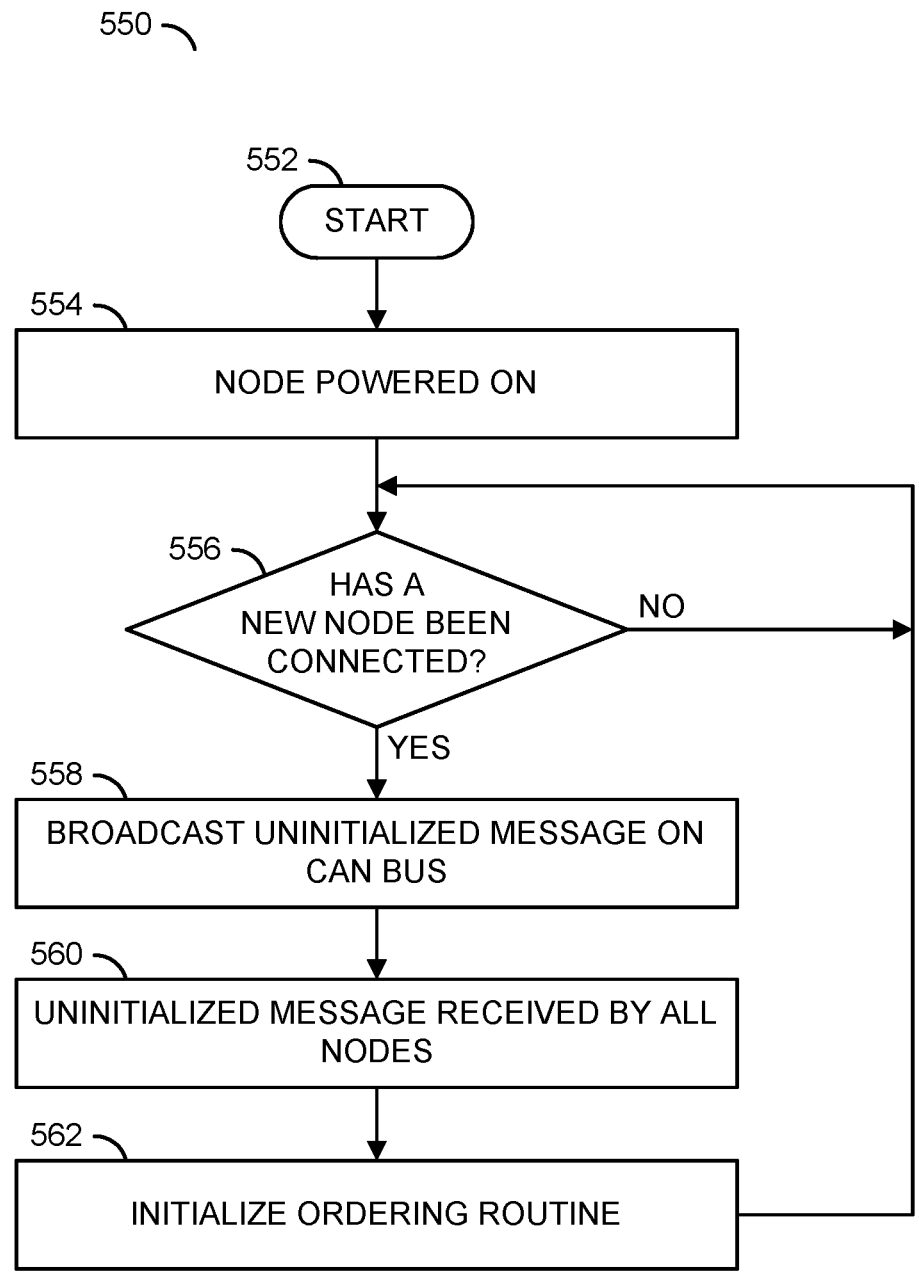
FIG. 11 is a flow diagram illustrating a method for detecting new nodes.

Referring to FIG. 11, a method (or process) 550 is shown. The method 550 may detect new nodes. The method 550 generally comprises a step (or state) 552, a step (or state) 554, a decision step (or state) 556, a step (or state) 558, a step (or state) 560 and a step (or state) 562.

The step 552 may start the method 550. In the step 554, the node 100*i* may be powered on. In one example, the node 100*i* may be powered by the power supply 202 via the power port 152. In another example, the node 100*i* may receive power via the hybrid network 104 (e.g., received by the bus power block 256). Next, the method 550 may move to the decision step 556.

In the decision step 556, the node 100*i* may determine whether there are any other nodes 100*a*-100*n* connected to the node 100*i* and/or whether a new one of the nodes 100*a*-100*n* has been connected to the node 100*i*. For example, the node 100*i* may communicate via the network ports 150*a*-150*b* to determine whether the node 100*h* or the node 100*j* is connected. If there are no other nodes 100*a*-100*n* connected to the node 100*i*, then the method 550 may return to the decision step 556. For example, the system 102 may continuously monitor for new nodes 100*a*-100*n* that are connected to the system 102. If there are other of the nodes 100*a*-100*n* connected to the node 100*i*, then the method 550 may move to the step 558. In the step 558, the microprocessor 250 may broadcast the uninitialized message on the CAN bus 300*c*-300*d* (e.g., using the signal CANH and CANL). Next, the method 550 may move to the step 560.

In the step 560, the nodes 100*a*-100*n* may each receive the uninitialized message generated by the node 100*i*. For example, when the microprocessor 250 broadcasts the uninitialized message on the CAN bus 300*c*-300*d*, each of the nodes 100*a*-100*n* connected to the system 102 may receive the uninitialized message. The master node may receive the uninitialized message. Next, in the step 562, the master node 100*a* may initialize the ordering routine. For example, the master node 100*a* may communicate an instruction on the CAN bus 300c-300d to each of the nodes 100a-100n to perform the ordering routine. Next, the method 550 may return to the decision step 556.

Figure 12:
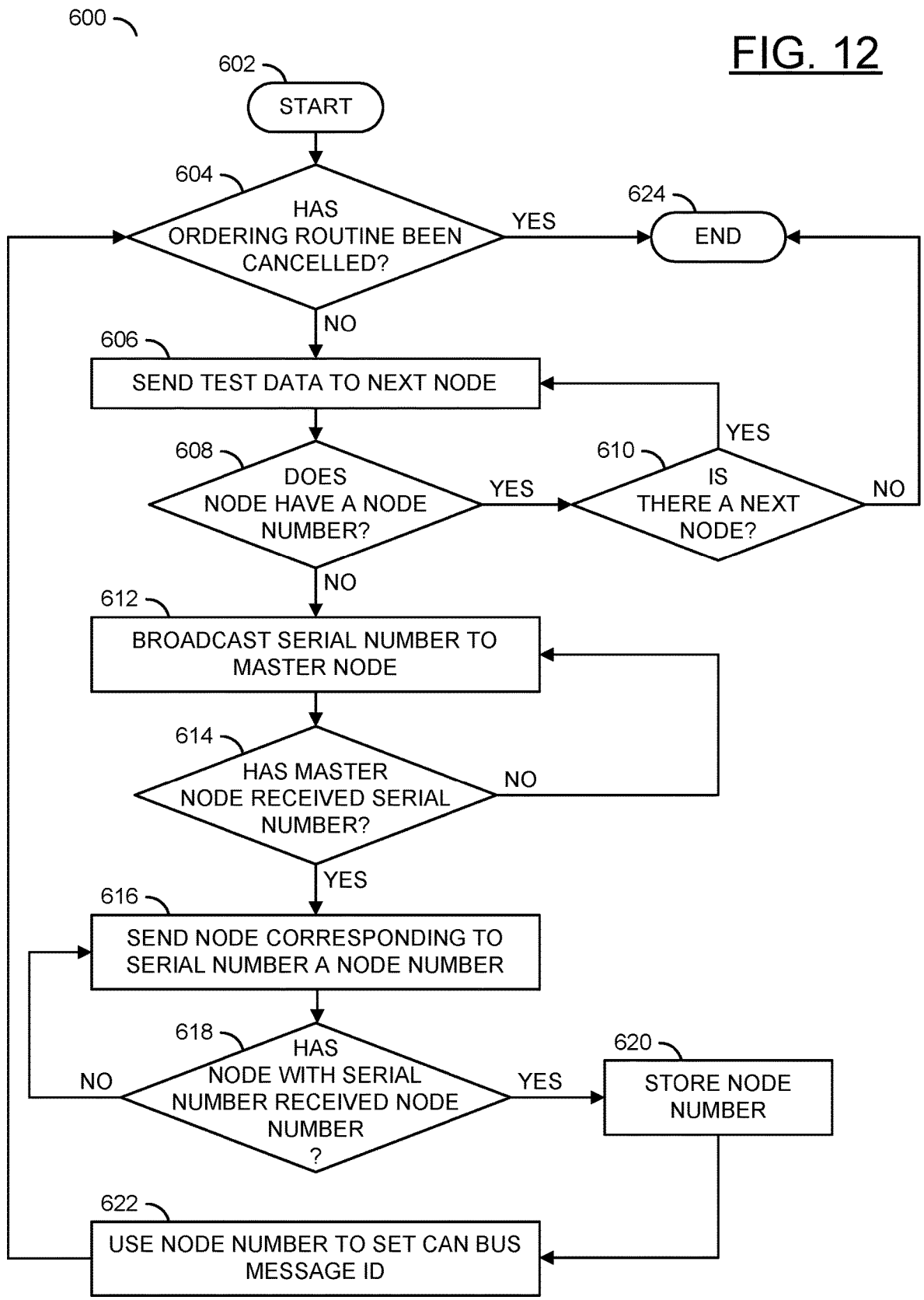
FIG. 12 is a flow diagram illustrating a method for implementing an ordering routine.

Referring to FIG. 12, a method (or process) 600 is shown. The method 600 may implement an ordering routine. The method 600 generally comprises a step (or state) 602, a decision step (or state) 604, a step (or state) 606, a decision step (or state) 608, a decision step (or state) 610, a step (or state) 612, a decision step (or state) 614, a step (or state) 616, a decision step (or state) 618, a step (or state) 620, a step (or state) 622 and a step (or state) 624.

The step 602 may start the method 600. In the decision step 604, the nodes 100a-100n may determine whether the ordering routine has been cancelled. In an example, the ordering routine may be cancelled in response to an instruction communicated on the CAN bus 300c-300d (e.g., using the signals CANH and CANL). While the decision to cancel the ordering routine is shown in the decision step 604, cancelling the ordering routine may be an interrupt operation that may be received at any time during the method 600. If the ordering routine has been cancelled, then the method 600 may move to the step 624. If the ordering routine has not been cancelled, then the method 600 may move to the step 606.

In the step 606, one of the nodes 100a-100n may send test data to a neighboring one of the nodes 100a-100n. Next, the method 600 may move to the decision step 608. In the decision step 608, the node 100a-100n that received the test data may determine whether the node has a node number. For example, the node number may be stored in the memory 252. If the node 100a-100n that received the test data does have a node number, then the method 600 may move to the decision step 610. In the decision step 610, the node 100a-100n that received the test data and has a node number may determine whether there is a next node. In an example, if the node 100b already has a node number, the node 100b may determine whether there is a next node 100c connected down the hybrid bus 104. In another example, if the node 100m already has a node number, the node 100m may determine whether there is a next node 100n connected down the hybrid bus 104. If there is a next node down the hybrid bus 104, then the method 600 may return to the step 606. If there is not a next node down the hybrid bus 104 (e.g., all the nodes 100a-100n have been assigned a node number), then the method 600 may move to the step 624. The step 624 may end the method 600. In an example, the node 100a may send the test data to the node 100b, the node 100b may send the test data to the node 100c, the node 100i may send the test data to the node 100j, etc. until all the nodes 100a-100n have received the node number.

In the decision step 608, if the node 100a-100n that received the test data does not have a node number, then the method 600 may move to the step 612. In the step 612, the node 100a-100n that does not have a node number and received the test data may broadcast a serial number stored in the ID block 296 (e.g., the identification value) back to the master node 100a. Next, the method 600 may move to the decision step 614.

In the decision step 614, the system 102 may determine whether the master node 100a has received the serial number. If not, the method 600 may return to the step 612. In an example, if the node 100i received the test data and did not have a node number assigned, then the node 100i may send the serial number back up the hybrid bus 104 to the node 100h. If the node 100h is not the master node, then the node 100h may communicate the serial number of the node 100i to the node 100g. The communication up the hybrid network 104 may continue until the master node 100a receives the serial number of the node 100i. In the decision step 614, if the master node 100a has received the serial number, then the method 600 may move to the step 616. In the step 616, the nodes 100a-100n may send the node number assigned by the master node 100a to the node 100a-100n that corresponds to the serial number. Next, the method 600 may move to the decision step 618.

In the decision step 618, the system 102 may determine whether the node 100a-100n that corresponds to the serial number sent by the master node 100a has received the node number. If not, then the method 600 may return to the step 616. In an example, if the node 100a has assigned the serial number to the node 100i, then the node 100a may send the node number for the node 100i to the node 100b, then the node 100b may pass the information down the hybrid bus 104 to the node 100c, etc. until the node 100i receives the node number. In the decision step 618, if the node 100a-100n that corresponds to the serial number sent by the master node 100a has received the node number, then the method 600 may move to the step 620. In the step 620, the node 100a-100n that corresponds to the serial number sent by the master node 100a and received the node number may store the node number in the memory 252. Next, in the step 622, the node 100i that stored the node number may use the node number to set a CAN bus message ID. For example, once the node number is received/stored by one of the nodes 100a-100n, the node number may be used to set the node CAN bus message ID. Next, the method 600 may return to the decision step 604.

Figure 13:
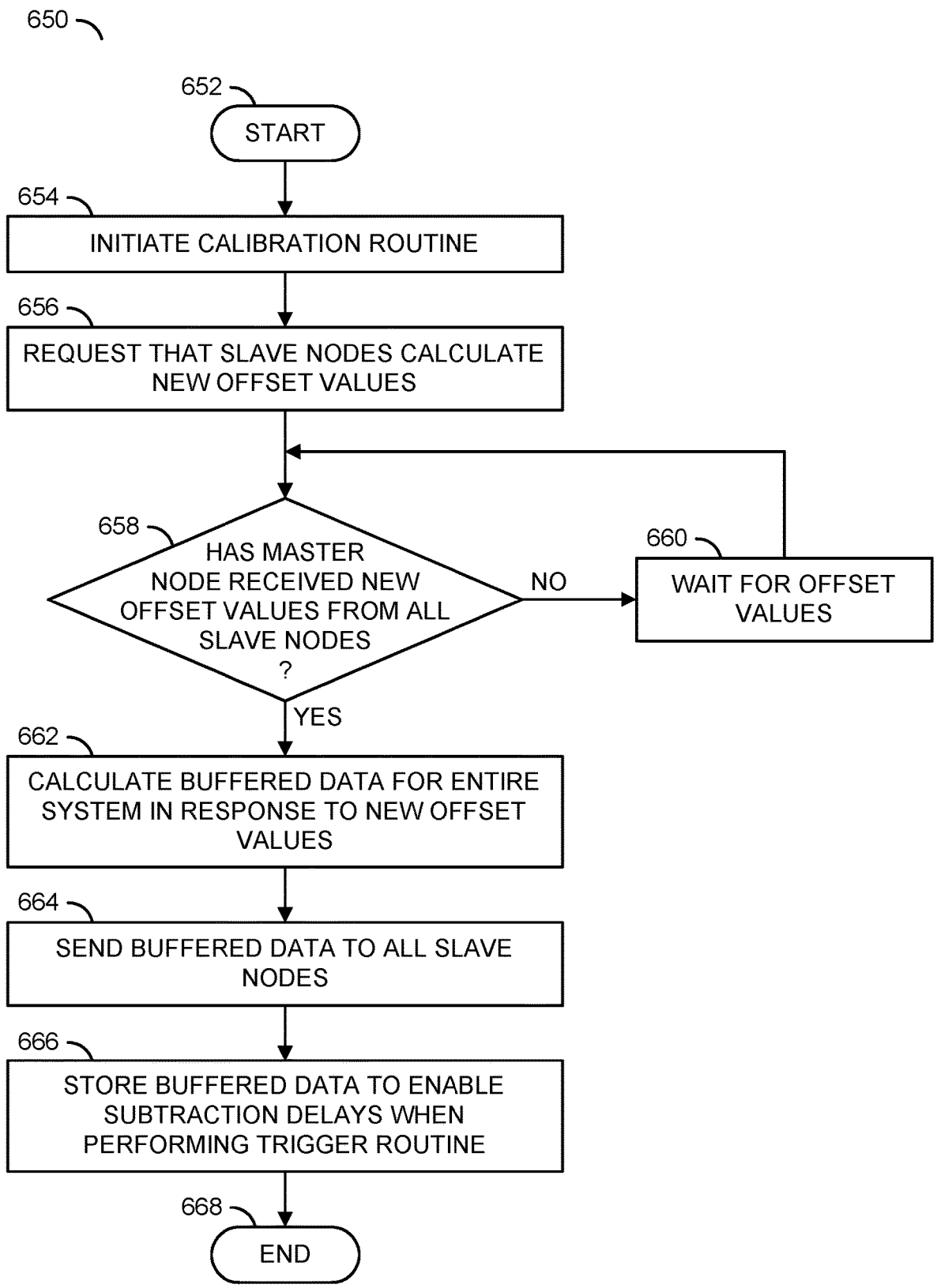
FIG. 13 is a flow diagram illustrating a method for implementing a calibration routine.

Referring to FIG. 13, a method (or process) 650 is shown. The method 650 may implement a calibration routine. The method 650 generally comprises a step (or state) 652, a step (or state) 654, a step (or state) 656, a decision step (or state) 658, a step (or state) 660, a step (or state) 662, a step (or state) 664, a step (or state) 666, and a step (or state) 668.

The step 652 may start the method 650. In the step 654, the master node 100a may initiate the calibration routine. The calibration routine may be stored in the memory 252 (e.g., the calibration routine instructions 298) of each of the nodes 100a-100n. Next, in the step 656, the node 100a may request that each of the slave nodes 100b-100n calculate new offset values 290. Each of the slave nodes 100b-100n may calculate new offset values by the respective microprocessor 250 executing the calibration routine instructions 298. Next, the method 650 may move to the decision step 658.

In the decision step 658, the master node 100a may determine whether the offset values 290 have been received from all of the slave nodes 100b-100n. If the master node 100a has not received all of the offset values 290, then the method 650 may move to the step 660. In the step 660, the master node 100a may wait for the offset values 290. In an example, the slave nodes 100b-100n may calculate the offset values 290 and then communicate the offset values up the hybrid bus 104 (e.g., the node 100i may communicate the offset values 290 to the node 100h, the node 100h may communicate the offset values 290 from the node 100h and the node 100i to the node 100g, etc.). Next, the method 650 may return to the decision step 658. In the decision step 658, if the master node 100a has received the new offset values 290 from all of the slave nodes 100b-100n, then the method 650 may move to the step 662.

In the step 662, the master node 100a may calculate buffered data for the entire system 102 in response to the new offset values 290 received from the slave nodes 100b-100n. Next, in the step 664, the master node 100a may send the buffered data to all of the slave nodes 100*b*-100*n*. In the step 666, the slave nodes 100*b*-100*n* may store the buffered data from the master node 100*a* in the memory 252. The buffered data may enable a subtraction of delays for triggering the connected triggering devices 50*a*-50*n* according to the standard timing when performing the triggering routine. Next, the method 650 may move to the step 668. The step 668 may end the method 650.

Figure 14:
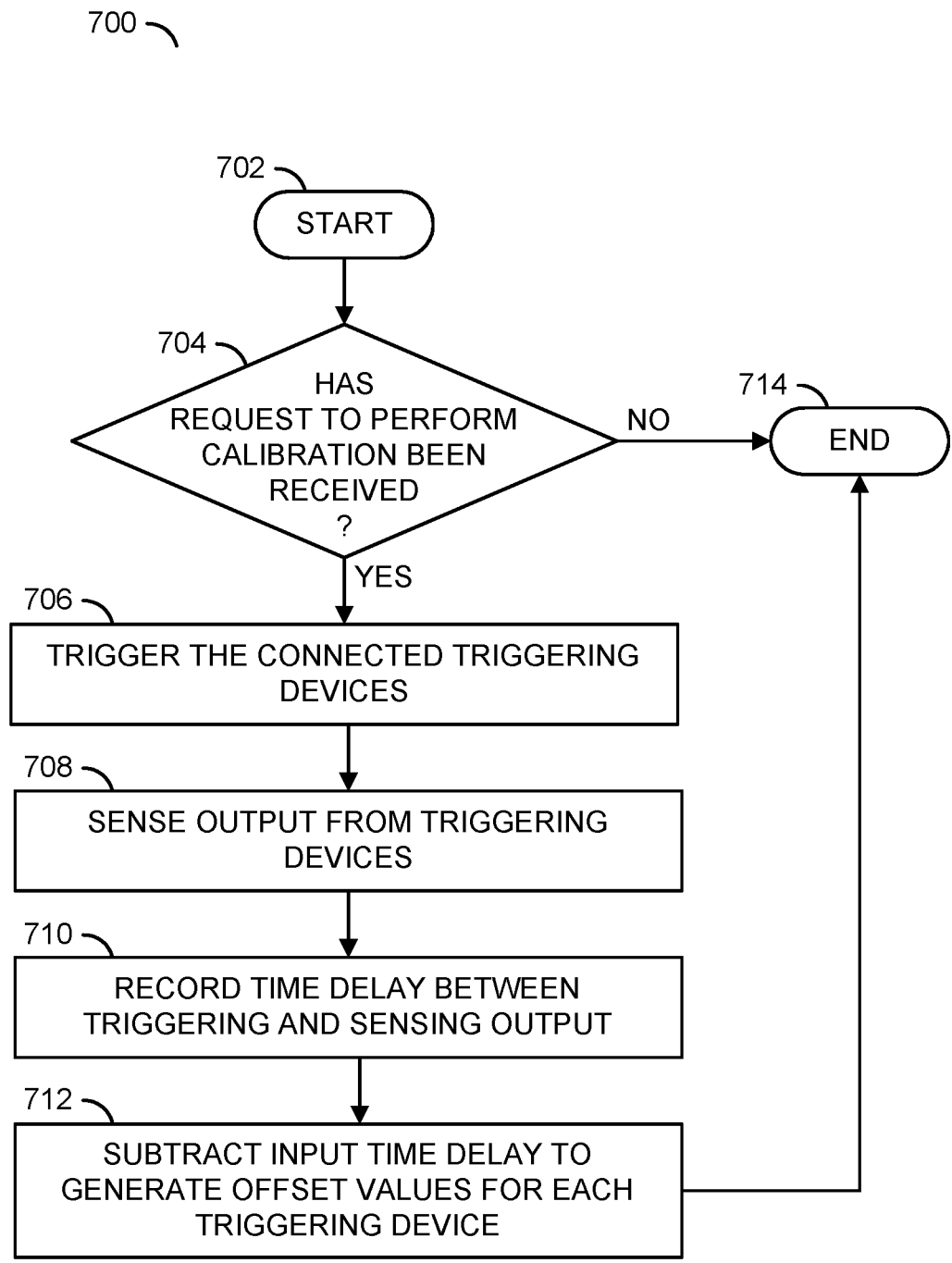
FIG. 14 is a flow diagram illustrating a method for determining offset values for a node in a calibration routine.

Referring to FIG. 14, a method (or process) 700 is shown. The method 700 may determine offset values for a node in a calibration routine. The method 700 generally comprises a step (or state) 702, a decision step (or state) 704, a step (or state) 706, a step (or state) 708, a step (or state) 710, a step (or state) 712, and a step (or state) 714.

The step 702 may start the method 700. Next, the method 700 may move to the decision step 704. In the decision step 704, one of the nodes 100*a*-100*n* (e.g., the node 100*i*) may determine whether a request to perform a calibration has been received. In an example, the master node 100*a* may communicate a request to the nodes 100*a*-100*n* to perform the calibration routine 298. If the request has not been received, then the method 700 may move to the step 714. If the request has been received, then the method 700 may move to the step 706.

In the step 706, the node 100*i* may trigger the connected triggering devices 50*a*-50*n*. In an example, the node 100*i* may present the signal OUT_A-OUT_N from the ports 120*a*-120*n*. Next, in the step 708, the node 100*i* may sense an output from the triggering devices 50*a*-50*n*. In an example, the microprocessor 250 may sense output received by the I/O block 258 from a strobe sync port of the triggering devices 50*a*-50*n*. In the step 710, the microprocessor 250 may record a time delay between the triggering of the triggering devices 50*a*-50*n* (e.g., a time when the signals OUT_A-OUT_N were generated) and sensing the output from the triggering devices 50*a*-50*n* (e.g., a time when the strobe sync input is received). Next, in the step 712, the microprocessor 250 may subtract the input time delay to generate the offset values 290 for each of the connected triggering devices 50*a*-50*n*. Next, the method 700 may move to the step 714. The step 714 may end the method 700.

Figure 15:
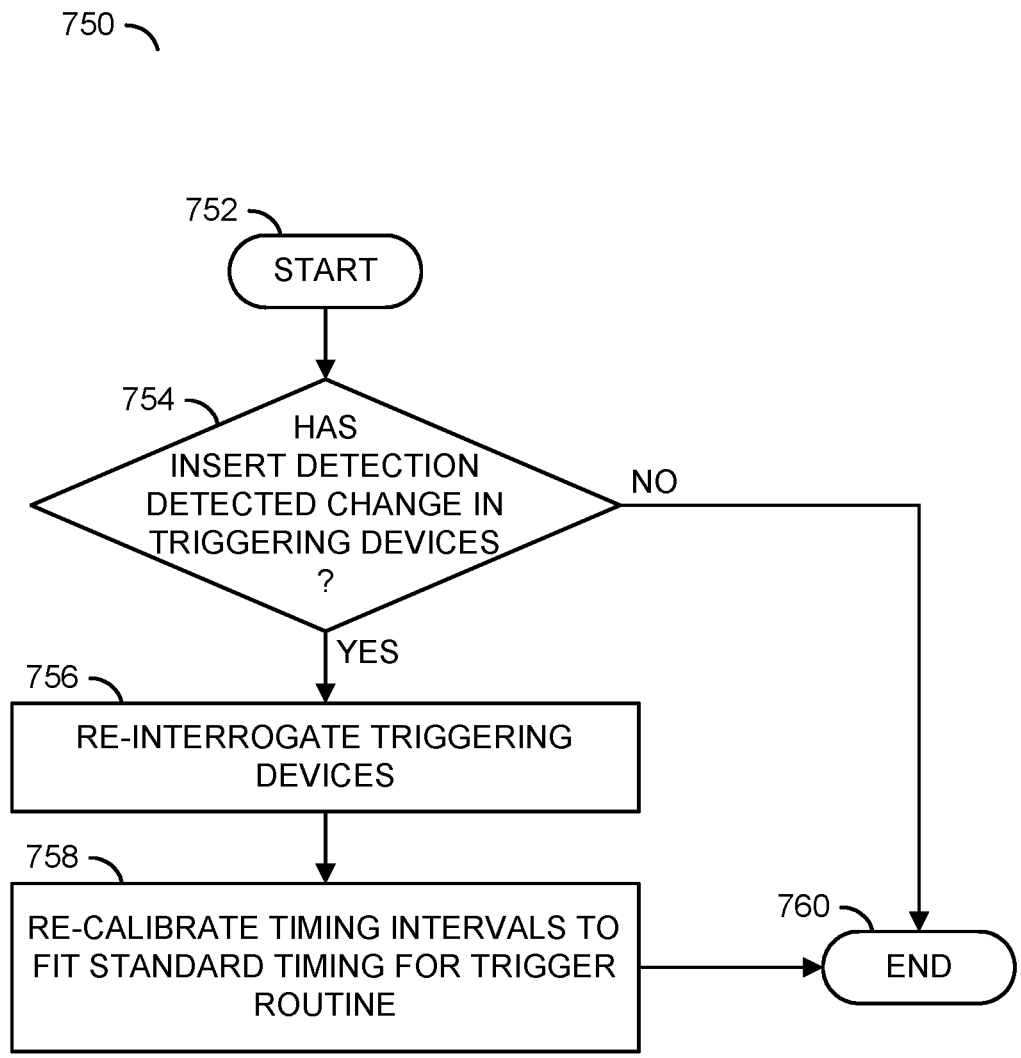
FIG. 15 is a flow diagram illustrating a method for re-calibrating system timing in response to detecting a new triggering device.

Referring to FIG. 15, a method (or process) 750 is shown. The method 750 may re-calibrate system timing in response to detecting a new triggering device. The method 750 generally comprises a step (or state) 752, a decision step (or state) 754, a step (or state) 756, a step (or state) 758, and a step (or state) 760.

The step 752 may start the method 750. Next, the method 750 may move to the decision step 754. In the decision step 754, the node 100*i* may determine whether the insert detection has detected a change in the triggering devices 50*a*-50*n* connected to the node 100*i*. In an example, the node 100*i* may be configured to automatically detect whether one or more of the triggering devices 50*a*-50*n* have been connected to or disconnected from the node 100*i* (e.g., whether there has been a change in the connection status of the output ports 120*a*-120*f* and/or the input/output ports 140*a*-140*c*). The insert detection may be implemented in hardware and/or software. If there has been no change detected by the insert detection, then the method 750 may move to the step 760. If there has been a change detected by the insert detection, then the method 750 may move to the step 756.

In the step 756, the microprocessor 250 may re-interrogate the triggering devices 50*a*-50*n*. In an example, the re-interrogation of the triggering devices 50*a*-50*n* may be similar to the method 700 described in association with FIG. 14. Next, in the step 758, the microprocessor 250 may re-calibrate the timing intervals to fit the standard timing for the trigger routine. Next, the method 750 may move to the step 760. The step 760 may end the method 750. In one example, after the re-calibration is performed in response to the insert detection, the trigger routine may be performed.

Figure 16:
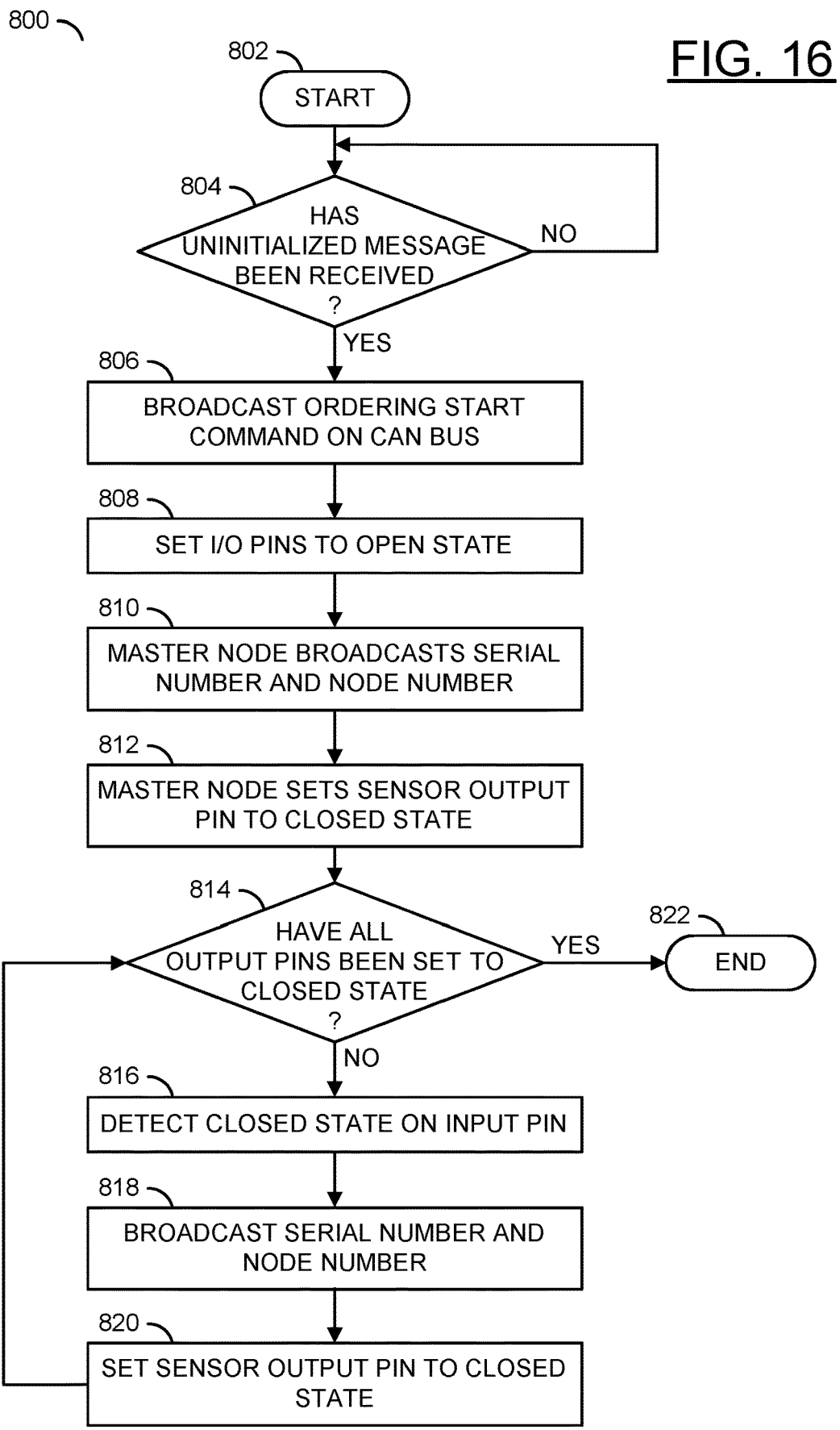
FIG. 16 is a flow diagram illustrating an alternate method for implementing an ordering routine.

Referring to FIG. 16, a method (or process) 800 is shown. The method 800 may be an alternate method for implementing an ordering routine. The method 800 generally comprises a step (or state) 802, a decision step (or state) 804, a step (or state) 806, a step (or state) 808, a step (or state) 810, a step (or state) 812, a decision step (or state) 814, a step (or state) 816, a step (or state) 818, a step (or state) 820, and a step (or state) 822.

The step 802 may start the method 800. Next, in the decision step 804, the master node (e.g., in an example, the node 100*a* may be the master node) may determine whether the uninitialized message has been received. For example, the uninitialized message may be broadcast on the CAN bus 300*c*-300*d* by one of the nodes 100*a*-100*n* when connected to the system 102. If the uninitialized message has not been broadcast to the master node 100*a*, then the method 800 may return to the decision step 804. In an example, the master node 100*a* may continually monitor for the uninitialized message on the CAN bus 300*c*-300*d*. If the uninitialized message has been received by the master node 100*a*, then the method 800 may move to the step 806.

In the step 806, the master node 100*a* may broadcast an ordering start command on the CAN bus 300*c*-300*d*. The ordering start command may cause the nodes 100*a*-100*n* to initialize the ordering routine. Next, in the step 808 each of the nodes 100*a*-100*n* may set the pins of the sensor I/O modules 282-284 (e.g., the signal SOA, SIA, SOB and/or SIB) to an open state. In the step 810, the master node 100*a* may broadcast the serial number stored in the ID block 296 and the node number of the master node 100*a* on the CAN bus 300*c*-300*d*. Next, in the step 812, the master node 100*a* may set the sensor output pin of the sensor I/O module 284 (e.g., the signal SOB) to a closed state. Setting the sensor output pin to the closed state may provide an indication to the next node to perform a similar broadcast. Next, the method 800 may move to the decision step 814.

In the decision step 814, the system 102 may determine whether all of the output pins (e.g., the signal SOB of each of the nodes 100*a*-100*n* in the system 102) have been set to the closed state. If all the output pins have not been set to the closed state, then the method 800 may to the step 816. In the step 816, the next one of the nodes 100*a*-100*n* may detect the closed state of the output pin from the previous node on the sensor I/O module 282 (e.g., the upstream input of the signal SIA). Next, in the step 818, in response to detecting the closed state from the upstream node, the next of the nodes 100*a*-100*n* may broadcast the serial number stored in the ID block 296 and the node number on the CAN bus 300*c*-300*d*. In the step 820, the sensor output pin of the sensor I/O module 284 (e.g., the signal SOB) may be set to a closed state. Next, the method 800 may return to the decision step 814. In an example, the steps 816-820 may be repeated until all of the nodes 100*a*-100*n* have performed the broadcast of the serial number and node number. Setting the sensor output pin of the sensor I/O module 284 may be an indication to the next node downstream to perform the steps 816-820.

In the decision step 814, if all of the output pins have been set to the closed state, then the method 800 may move to the step 822. The step 822 may end the method 800.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a plurality of output ports each configured to (a) connect to a respective trigger device and (b) generate an output signal to activate said respective trigger device; and
a processor configured to (a) determine a number of said trigger devices connected to said output ports, (b) determine a trigger timing between each of said number of said trigger devices connected, (c) convert said trigger timing for each of said trigger devices to fit a synchronized capture time using offset values specific to each of said trigger devices and (d) perform a trigger routine to trigger said output signal for each of said trigger devices connected, wherein
(i) said trigger routine activates each of said trigger devices connected according to said synchronized capture time,
(ii) said offset values delay triggering said trigger devices to ensure that said trigger devices are activated at said synchronized captured time,
(iii) said synchronized capture time is initiated in response to instructions received from a bus, and
(iv) said apparatus is configured to self-terminate said bus in response to detecting that said apparatus is located at one of the ends of said bus.

2. The apparatus according to claim 1, wherein said synchronized capture time is repeated at one of 23.98 frames per second, 24 frames per second, 29.97 frames per second, 30 frames per second, 59.94 frames per second, and 60 frames per second.

3. The apparatus according to claim 1, wherein said synchronized capture time provides a ramping cinematic effect with timing intervals decreasing by a pre-defined amount after each activation of said trigger devices.

4. The apparatus according to claim 1, wherein said synchronized capture time provides a ramping cinematic effect with timing intervals increasing by a pre-defined amount after each activation of said trigger devices.

5. The apparatus according to claim 1, wherein (i) said trigger devices are cameras and (ii) said synchronized capture time enables capturing a single image from each of said cameras.

6. The apparatus according to claim 1, wherein said processor is configured to automatically determine said trigger timing when one of said trigger devices is connected or disconnected from any of said output ports.

7. The apparatus according to claim 1, wherein said processor is configured to determine said trigger timing for each of said number of said trigger devices regardless of which of said output ports said trigger devices are connected to.

8. A system comprising:
a bus configured to (i) provide power and (ii) enable communication of a trigger routine; and
a plurality of nodes each configured to (i) receive said power from said bus, (ii) communicate with said nodes connected to said bus using said communication standard, (iii) connect to at least one of a plurality of external devices, (iv) determine a time delay for triggering each of said external devices connected, (v) perform a calibration routine in response to said time delay to determine timing data for each of said external devices connected, (vi) perform said trigger routine to trigger each of said external devices connected and (vii) self-terminate said bus using a termination relay independent from an order of said plurality of nodes in said system.

9. The system according to claim 8, wherein
(i) said plurality of nodes are configured to (a) broadcast buffered data to configure each of said nodes according to said timing data before said trigger routine is initiated and (b) initiate said trigger routine for each of said nodes based on said buffered data, and
(ii) said buffered data comprises an offset value and said offset value is determined by subtracting said time delay for each of said external devices.

10. The system according to claim 9, wherein said trigger routine is configured to delay triggering each of said external devices in response to said offset value.

11. The system according to claim 8, wherein (i) at least one of said external devices is a camera and (ii) said plurality of nodes are configured to determine said time delay for said camera without analyzing an image captured by said camera.

12. The apparatus according to claim 1, wherein said offset values are calculated to correct differences in operation between said trigger devices.

13. The apparatus according to claim 12, wherein said differences comprise an inherent delay in activation of at least one of said trigger devices.

14. The apparatus according to claim 12, wherein said processor is further configured to (i) determine an amount of time to activate each of said trigger devices and (ii) generate said offset values to enable said trigger devices with different activation timings to generate output at the same time.

15. The apparatus according to claim 1, wherein said synchronized capture time is repeated at a variable frame rate.

16. The system according to claim 8, wherein said trigger routine is configured to activate each of said external devices at the same time.

17. The system according to claim 8, wherein said trigger routine is configured to activate each of said external devices sequentially based on an interval timing.

18. The system according to claim 17, wherein said interval timing is provided by a computer connected to one of said plurality of nodes.

19. The system according to claim 17, wherein said interval timing is increased or decreased after each time said external devices are activated.

20. The system according to claim 8, wherein (i) said timing data comprises an offset value and said offset value is determined by subtracting said time delay for each of said external devices, (ii) said external devices are cameras and (iii) said cameras are activated once based on said offset value so that each of said cameras capture an image at the same time.

* * * * *